(12) United States Patent  (10) Patent No.: US 6,688,672 B2
Kay  (45) Date of Patent: Feb. 10, 2004

(54) CAMPER TIE-DOWN SYSTEM

(75) Inventor: Jack Kay, 32820 - Lake Umek Rd., SE., Palmer, WA (US) 98051

(73) Assignees: Jack Kay, Kent, WA (US); Anthony Kay, Kent, WA (US); part interest ( * ) Notice: Subject to any disclaimer, the term of this patent is extended or adjusted under 35 U.S.C. 154(b) by 0 days.

(21) Appl. No.: 09/908,474

(22) Filed: Jul. 17, 2001

(65) Prior Publication Data

US 2002/0014786 A1 Feb. 7, 2002

Related U.S. Application Data

(63) Continuation-in-part of application No. 09/422,837, filed on Oct. 21, 1999, now Pat. No. 6,260,910.
(51) Int. Cl.$^7$ .............................................. B60R 15/00
(52) U.S. Cl. ...................................................... 296/167
(58) Field of Search ............................ 296/167, 35.1, 296/35.3

(56) References Cited

U.S. PATENT DOCUMENTS

| | | | |
|---|---|---|---|
| 3,368,785 A | 2/1968 | Weiler | 296/167 |
| 3,655,234 A | 4/1972 | Kirschbaum | 296/167 |
| 3,706,469 A | 12/1972 | Covert | 296/167 |
| 3,719,382 A | 3/1973 | Palm | 296/167 |
| 3,782,774 A | 1/1974 | Sturek | 296/167 |
| 4,630,990 A | 12/1986 | Whiting | 414/462 |
| 5,439,152 A | 8/1995 | Campbell | 224/405 |
| 5,649,656 A | 7/1997 | Davy | 224/405 |
| 5,836,635 A | 11/1998 | Dorman | 296/3 |

FOREIGN PATENT DOCUMENTS

| | | | |
|---|---|---|---|
| CA | 961531 | 1/1975 | 296/167 |

*Primary Examiner*—Joseph D. Pape
(74) *Attorney, Agent, or Firm*—R. Reams Goodloe, Jr.

(57) ABSTRACT

A camper tie-down. The tie down is provided for mounting a load such as a camper to pre-existing mounting structure on a motor vehicle frame, such as a hitch or frame portion. The tie-down includes a retractable base portion, an adjustable tension member, and a shock absorbing cushioning member. The tie-down minimizes or eliminates drilling, cutting, welding or other custom mounting structure for installation on most vehicles. One embodiment includes bullet shaped extension plates for extending the attachment point of arms forward or rearward, as appropriate depending on whether the attachment is to be made at the front or at the rear of the vehicle.

40 Claims, 16 Drawing Sheets

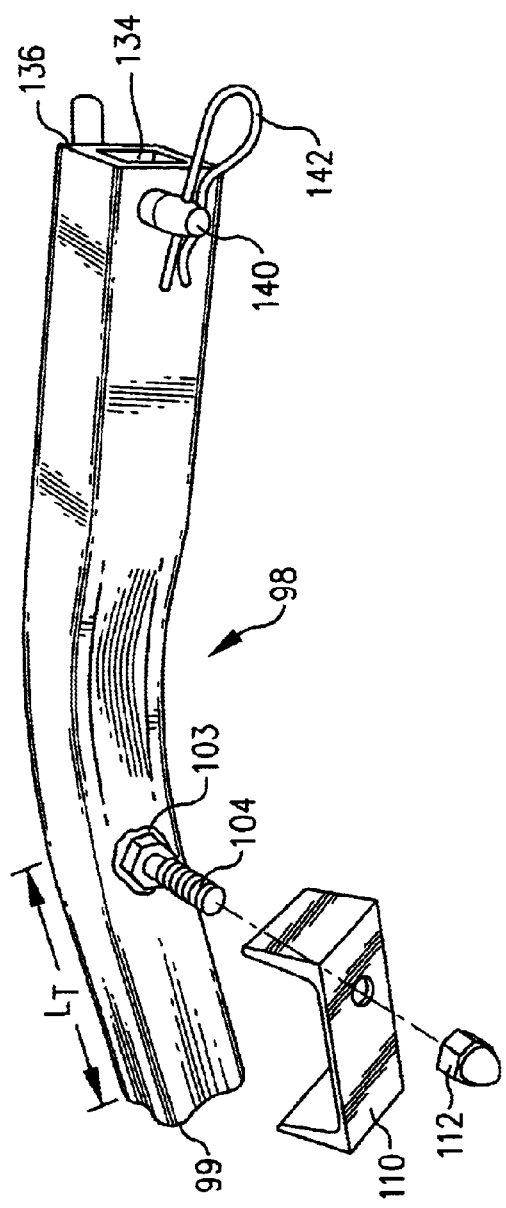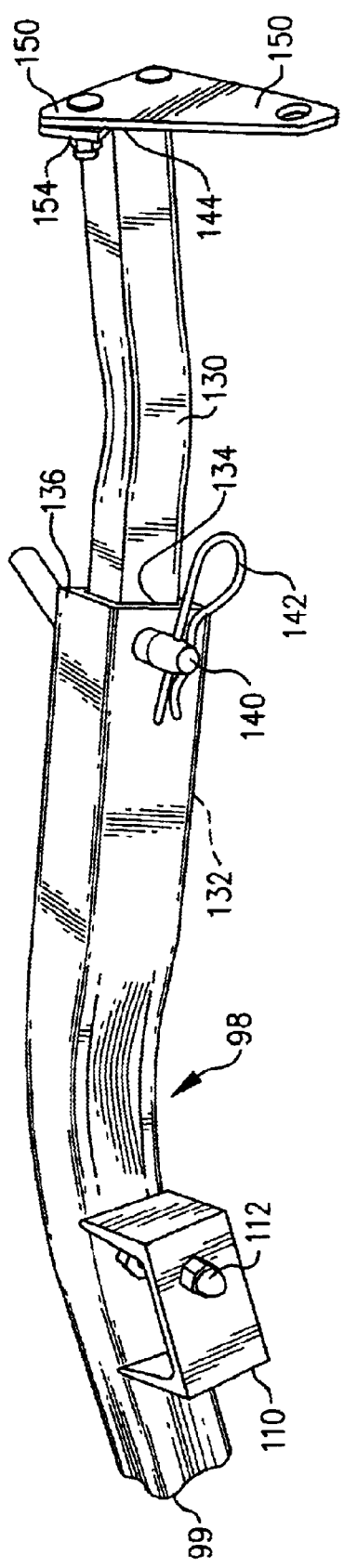

CAMPER TIE-DOWN SYSTEM

This application is a continuation-in-part under 35 U.S.C. Section 120 of prior U.S. Non-Provisional Patent Application No. 09/422,837 filed Oct. 21, 1999, now U.S. Pat. No. 6,260,910, the disclosure of which is incorporated herein by this reference.

TECHNICAL FIELD

The invention(s) presented herein relate to tie downs for attachment of objects to vehicle frames. More particularly, this disclosure is directed to improved tie downs to secure camper bodies to pick-up trucks.

BACKGROUND

Tie-downs for mounting objects on motor vehicle frames are well known. Such tie downs are often provided for fixed installation to the frame, or to the underside of a vehicle (such as a pick-up truck), for securing a load (such as a camper) to the vehicle frame. Generally, four such tie downs are installed on a vehicle for securing the camper to the pick-up truck's bed at or near all four corners. The tie downs used by others, in so far as they are known to me generally include a cantilevered telescoping arm projecting horizontally from a secure position on the vehicle frame. Such prior art tie downs include a rigid support member projecting perpendicularly from an outer sleeve of a cantilevered telescoping arm to fixedly attach to a point on the underside of the vehicle to brace the tie down when the load is secured. Also, such tie downs include a chain having one end attached to the end of the telescoping arm opposite the frame mount and the other end free for fixedly attaching to the load, such as a camper, to secure it to the vehicle. The load is secured to the vehicle by tensioning the chain using, for example, a turnbuckle. Thus tensioned, the chain is a rigid member unable to relieve sudden loads, such as those caused by shifting of the camper relative to the truck bed. Such sudden load, when not relieved, may exceed the stress-bearing capabilities of the joints mounting the tie downs to the vehicle and may loosen the joints and/or damage either or both of the vehicle and the tie downs. While a spring-loaded turnbuckle is known, it is a separate assembly from the tie down and forms no part of the tie down.

It is a drawback that the tie downs used by others must be professionally installed by qualified mechanics, primarily since they are normally provided from the factory in a single embodiment or configuration which requires drilling of additional mounting holes in the vehicle frame. The drilling of such holes in or adjacent to highly loaded or specially hardened steel frame members requires equipment and a skill level ordinarily available only to the professional installer. Furthermore, the warranties provided by many vehicle manufacturers might be violated or voided by the addition of such holes in the vehicle frame members. Therefore, such considerations severely limit the practical application of the known tie downs. Moreover, such restrictions have effectively prevented mail order or Internet distribution of such tie-down designs.

Undesirably, many tie downs also interfere with use of the vehicle even when the load is removed from the vehicle. This is because rigid support members, not easily or quickly removable, if at all, project from the sleeve of cantilevered telescoping arms, and thus places the tie down components in a position beneath the vehicle in a manner that may interfere with steps, bars and other platforms attached to many vehicles for ease of entry and exit. Many tie downs also interfere with use of the vehicle off-road, because they are positioned below the vehicle, near the ground, and might encounter brush, stumps, rocks and other low lying obstacles.

SUMMARY

The present invention overcomes many limitations of prior art tie-downs by providing a tie down for mounting to hitches, frames, or other pre-existing mounting structure on a vehicle. The present invention thus overcomes the need (found in many prior art devices) to drill, cut, weld or otherwise provide custom mounting structure for a tie downs, and thus tie downs can be provided for each major brand of vehicle, without the need to customize every tie down installation.

According to one aspect of the invention, the present invention provides first and second spaced apart, mutually perpendicular frame brackets, each frame bracket adapted for mating with pre-existing mounting holes or other structure on a vehicle frame. Generally, the first frame bracket is mounted to a vertical portion of the frame while the second frame bracket is mounted to a horizontal portion of the vehicle frame, i.e., the bottom of the vehicle. The retractable nature of the tie down is provided by a telescoping arm pivotally mounted to a first frame bracket, whereby the telescoping arm is able to rotate relative to the first frame bracket. The telescoping arm includes an outer sleeve, one end of which is rotatably suspended by a pivot mechanism from a face of the first mounting bracket, an inner arm nested in the outer sleeve and able to move axially relative to the outer sleeve, and a releasable clamp which secures the inner arm in fixed axial relationship with the outer sleeve.

According to another aspect of the invention, a support strut extending between the telescoping arm and the second frame bracket secures the telescoping arm in a fixed orientation with each of the first and second frame brackets.

According to another aspect of the invention, the telescoping arm includes a movable slide having a clamp for securing the slide in variable positions along the body of the telescoping arm's outer sleeve. The movable slide includes a second pivot mechanism projecting, to which one end of the support strut extending between the telescoping arm and the second frame bracket is pivotally mounted. The second or horizontally mounted frame bracket includes yet another pivot mechanism to which the other end of the support strut is mounted. Thus, one end of the support strut rotates about the pivot mechanism on the second frame bracket and the other end rotates about the pivot mechanism on the movable slide, while the slide moves along the longitudinal axis of the telescoping arm in order to allow the telescoping arm to rotate up and down relative to the first frame bracket, and thus into different angular orientations with respect to the vehicle frame.

According to still another aspect of the invention, the support strut is configured as a second telescoping arm and includes its own mechanism for locking its inner arm relative to its outer sleeve.

In yet still another aspect of the invention, the support strut is configured in a partially collapsed bent tubular configuration, so that a tubular insert is provided that is able to slide inside of a welded steel tube, without the need to remove weldment where the larger tube has been fabricated.

In yet still another aspect of the invention, a clamp is provided for attaching arms to a trailer hitch, which clamp eliminates the need to drill holes in a hitch or in a vehicle frame, in order to securely attach the arm to the hitch or frame.

In yet still another aspect of the invention, a bullet shaped (in cross-section) plate is provided to extend, either forward or aft, as the case may be, the attach point at the end of attachment arms, so that increased leverage is available to secure the load against shifting.

In yet another aspect of the invention, an easily adjustable clamp is provided for adjustment of arm positions relative to frame mounts.

In a still further aspect of the invention, a fixed size arm is provided with certain frame mounts, as such mounts easily serve a multitude of vehicles of the same make and/or model.

Various embodiments of the invention are disclosed in which the mechanical features described above are achieved in disparate physical configurations.

BRIEF DESCRIPTION OF THE DRAWING

FIG. 12 shows a load bearing arm similar to that just illustrated in FIGS. 9, 10, and 11 above, but now removed from the transverse rear tube of the hitch, and more clearly showing the first, interior end which is crimped and shaped to slidingly and snugly interfit into the transverse rear tube, as well as the U-shaped clamp, stud, and acorn nut.

FIG. 13 shows the load bearing arm just illustrated in FIG. 12 above, but now additionally showing the use of a tubular load bearing end piece having a first, interior end adapted to insert and snugly fit in close fitting relationship to the interior tubular wall of the second, exterior end of the load bearing arm, with the load bearing arm and tubular load bearing end piece secured together with a conventional pin and transverse cotter pin, and also showing at the second, exterior end of the tubular load bearing end piece, a bullet shaped (as if the bullet were cross-sectioned) mounting plate, affixed to the mounting foot of the tubular load bearing end piece.

In the various figures, like numerals indicate like elements, and may be used without additional discussion thereof. In addition, the foregoing figures, being exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of the camper tie-down system are also shown and briefly described to enable the reader to understand how various optional features may be utilized in order to provide an easy to install, reliable camper tie-down system.

DETAILED DESCRIPTION

Figure 1:
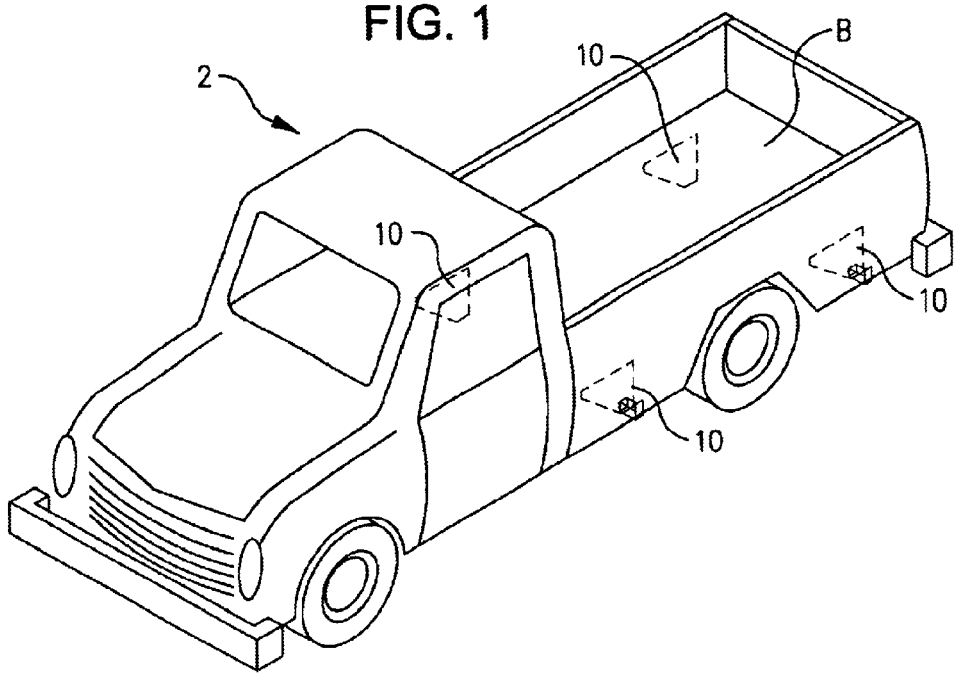
FIG. 1 illustrates a pictorial isometric view of an unmodified vehicle, for example a pick-up truck, having four retractable frame mounted tie downs of the invention installed thereon.

FIG. 1 is a pictorial isometric view of an unmodified vehicle 2, for example a pick-up truck, having four retractable frame mounted tie downs 10 of the type taught herein installed thereon. In FIG. 1, four retractable frame mounted tie downs are shown in the retracted configuration. The four retractable frame mounted tie downs 10 are shown in phantom lines indicating that, in the retracted configuration, the tie downs 10 lie entirely beneath the vehicle such that they do not interfere with use of the vehicle when a load to be tied down is not present. In the retracted configuration, the retractable frame mounted tie downs 10 do not interfere with steps, bars and other platforms attached to many vehicles 2 for ease of entry and exit. In the retracted configuration, the retractable frame mounted tie downs 10 also do not interfere with use of the vehicle off-road because the tie downs 10 are positioned on a vehicle 2 frame portion and are retracted, preferably within the vehicle 2 wheelbase tread dimension such that brush, stumps, rocks and other low lying obstacles are not encountered by the tie downs 10.

Figure 2:
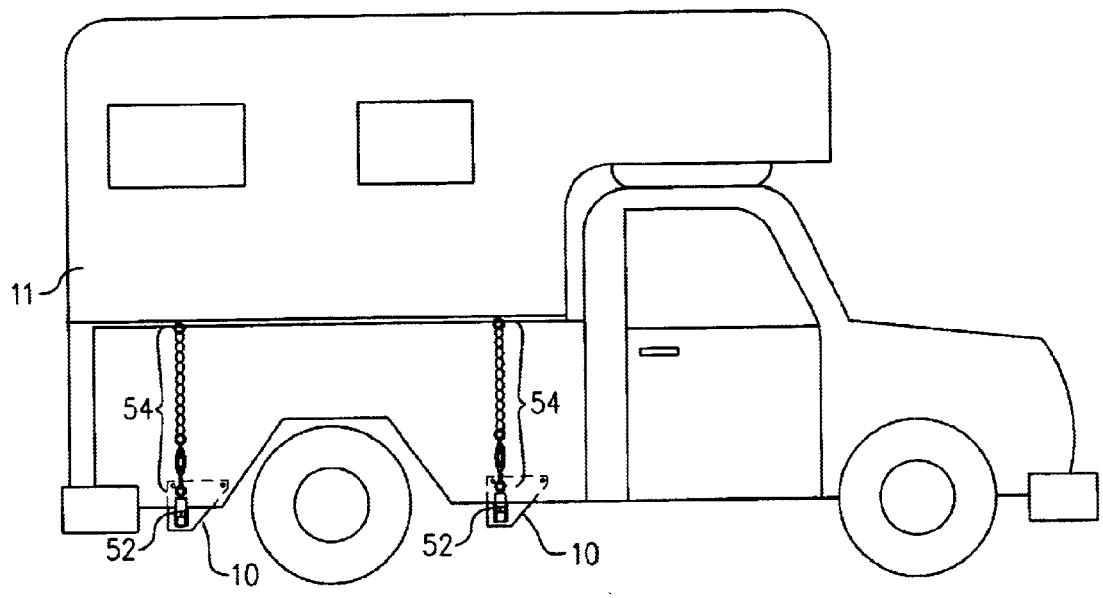
FIG. 2 shows a side view of the vehicle of FIG. 1 with a camper installed in the pick-up bed and the retractable frame mounted tie downs of the invention extended to secure the camper.

FIG. 2 shows a side view of the vehicle 2 with a load, for example a camper II, installed in the pick-up bed B. In FIG. 2, the retractable frame mounted tie downs 10 are extended to secure the load, i.e. the camper 11. A shock absorber 52 and adjustable tension member 54 (both described in detail below) are used secure a load such as camper 11 to the tie downs 10.

Figure 3:
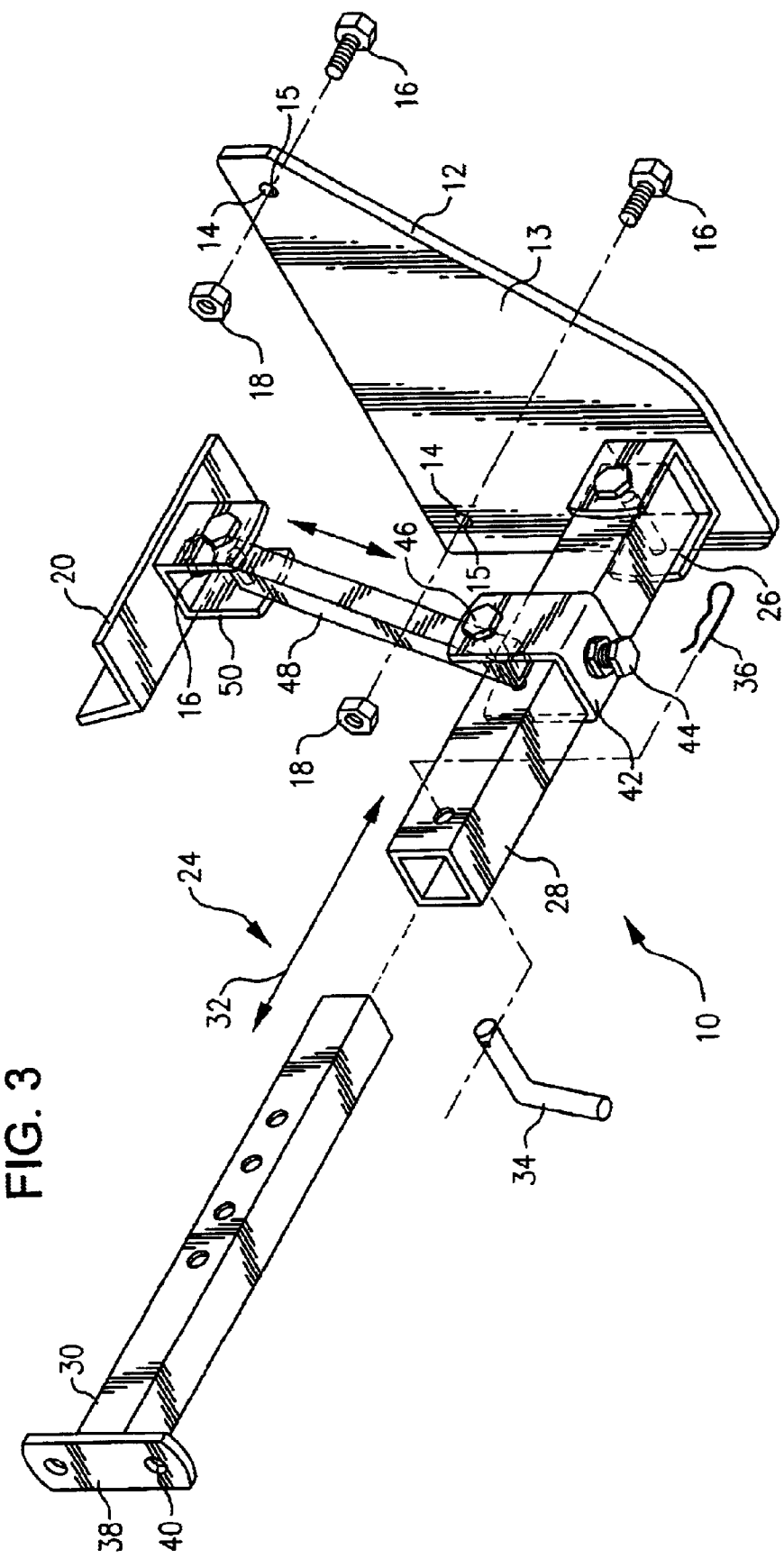
FIG. 3 is an exploded view of one exemplary embodiment of the retractable frame mounted tie downs of the invention.
Figure 4:
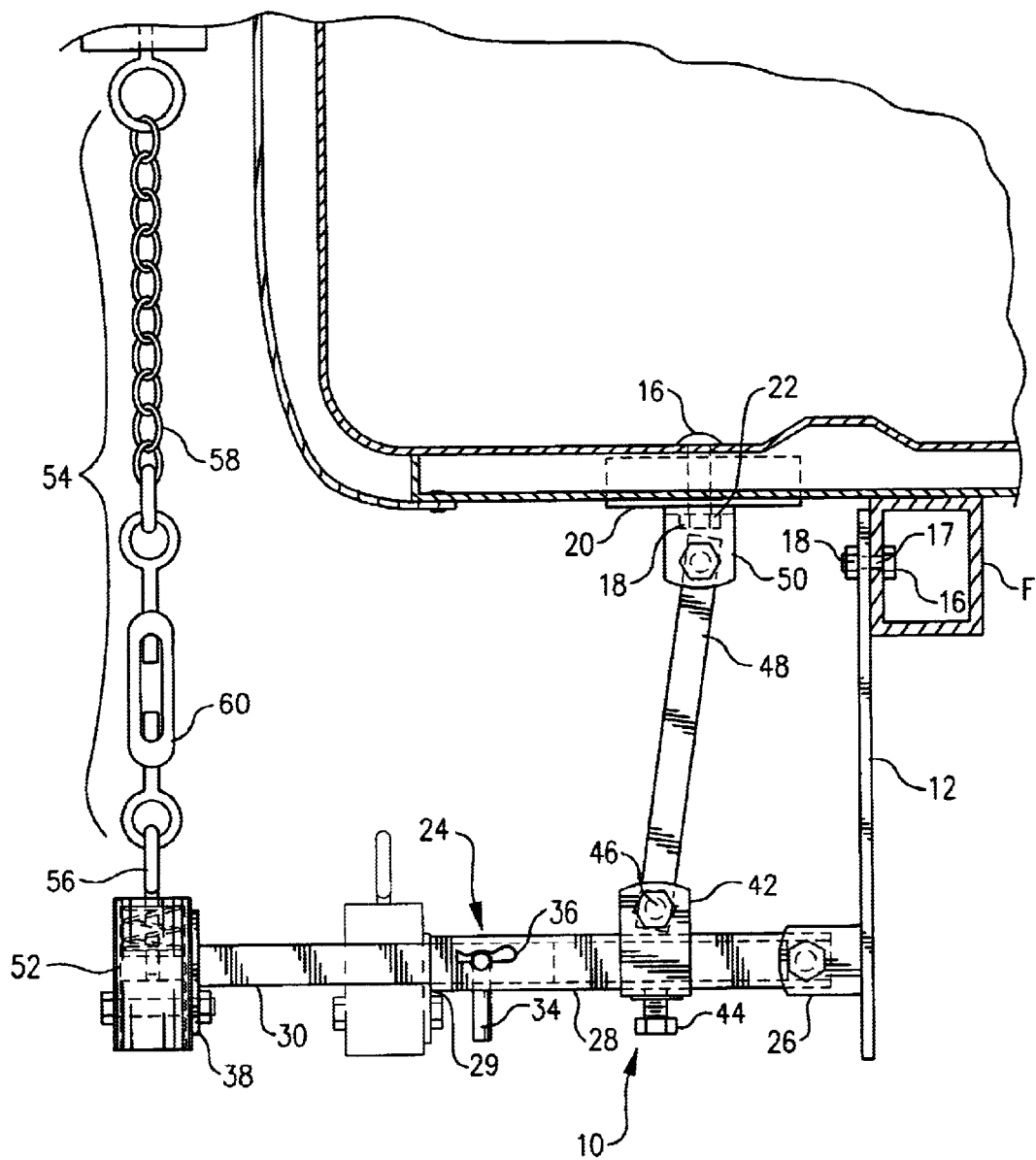
FIG. 4 illustrates the spaced apart, mutually perpendicular relationship of first and second frame brackets of the retractable frame mounted tie downs of the invention as installed on a vehicle frame using fasteners threaded through pre-existing mounting holes on the vehicle frame provided by the original manufacturer such that no drilling of the vehicle frame is needed for installation.

FIG. 3 is an exploded view of one exemplary embodiment of my novel retractable frame mounted tie downs 10. The various details of tie down 10 are preferably formed of a sturdy machinable metal or other material of suitable strength, such as steel, aluminum or another appropriate material. As shown in this exemplary embodiment, a first mounting bracket 12 is configured as an essentially flat metal plate 13 having one or more mounting apertures 14 defined by edgewall portions 15 and positioned to mate with pre-existing mounting apertures 17 on a frame portion F of a pre-selected vehicle 2, as provided by a original equipment manufacturer. Mounts 14 (preferably mounting apertures defined by edge wall portion 15) have dimensions sized complementary to pre-existing matching holes on a pre-selected vehicle. The size and location of mounts 14 vary for particular makes and models of vehicles 2, so that in any application the location of mounts 14 match the size and location of particular pre-existing matching holes 17 located on the frame F of pre-selected vehicle. Mounts 14, when configured as holes, accept bolts 16 previously passed through the pre-existing matching holes 17 in the frame F of a vehicle 2. Nuts 18 are threadingly engage bolts 16 and are tightened to secure first mounting bracket 12 in place against frame of the vehicle 2, as shown in FIG. 4, and as described in further detail below. If the pre-selected vehicle includes pre-existing threaded mounting studs protruding from frame F (as an alternative to pre-existing matching holes formed in the frame), then the mounting studs are provided in place of the illustrated bolts 16, and the mounts 14 in mounting bracket 12 are fitted over such pre-existing studs. Then, nuts 18 are used to secure bracket 12 to the vehicle frame. Mounts 14 may alternatively be provided as threaded studs affixed to one surface of bracket 12, and sized and positioned to mate with the pre-existing matching holes 17 in frame F of the desired vehicle; nuts 18 secure bracket 12 to the vehicle frame. Mounts 14 therefore mate with pre-existing matching holes or other mounting mechanism in the vehicle frame provided by the manufacturer such that installation of bracket 12 requires no modification to the vehicle frame.

A second frame bracket 20 is spaced apart from and oriented perpendicular to first frame bracket 12. While first frame bracket 12 is configured to mount to a vertical portion of the vehicle frame, second frame bracket 20 is configured to mount to a horizontal portion of the vehicle frame, i.e., the bottom of the vehicle, as shown in FIG. 4 and described below. Second frame bracket 20 includes one or more mounts 22 similar in description to mounts 14 of first frame bracket 12. In a preferred configuration, mounts 22 are mounting holes formed in second frame bracket 20 sized and positioned to mate with matching pre-existing mounting holes in the vehicle frame such that second frame bracket 20 is mounted and secured without modification to the vehicle frame. Mounts 22, when configured as holes, accept bolts 16 previously threaded through the pre-existing matching holes on the desired vehicle and nuts 18 (shown in FIG. 4) secure second mounting bracket 20 in place on the vehicle, as shown in FIG. 4 and described in detail below.

A telescoping load bearing arm 24 is rotatably suspended at one end from first frame bracket 12, preferably by a first pivot mechanism 26 fixed to one surface of first frame bracket 12. First pivot mechanism 26 preferably constrains telescoping arm 24 to rotate in a plane essentially perpendicular to the generally planar surface of first frame bracket 12. Telescoping arm 24 includes an outer sleeve 28 that is pinned to first frame bracket 12 at one end by first pivot mechanism 26. Beyond distal end 29, telescoping arm 24 also includes an inner arm portion 30 configured to fit inside outer sleeve 28 with sufficient clearance to move or slide axially relative to outer sleeve 28 as indicated by double-pointed arrow 32. Each of outer sleeve 28 and inner arm 30 are, preferably, configured as commonly available standard square (shown), rectangular or tubular extruded sections. A releasable mechanical arm fastener 34 fixes inner arm 30 in an adjustable axial relationship with outer sleeve 28. Releasable arm fastener 34 is, for example, an "L" pin secured with a security pin 36. However, those of ordinary skill in the art will recognize that many variations of pins and security pins, including clevis pins with cotter pins and even bolts with nuts, may alternatively replace the "L" pin and security pin shown. Also, telescoping arms having a twisting mechanism for fixing the inner arm and outer sleeve in axial relationship to one another are known and contemplated by an alternative embodiment of the present invention. Thus, the invention does not contemplate being limited to the exemplary embodiment shown in the figures and described herein.

Inner arm 30 of telescoping arm 24 includes a mechanism for rotatably mounting a tensioning device, shown in FIG. 4 and described in detail below. For example, according to one embodiment of the invention shown in FIG. 3, inner arm 30 includes a foot 38 mounted at the end projecting from outer sleeve 28. Foot 38 includes a universal mounting mechanism 40, preferably configured as a through hole (shown). Alternatively, foot 38 is a "U" shaped structure and mounting mechanism 40 is a pin or rod extending between the two parallel legs of the "U" shaped structure. Again, those of ordinary skill in the art will recognize that many variations of foot 38 and mounting mechanism 40 are known and contemplated by alternative embodiments of the present invention. Thus, the invention does not contemplate being limited to the exemplary embodiment shown in the figures and described herein.

A slide 42 is movably mounted on outer sleeve 28 of telescoping arm 24. Slide 42 is configured for axial motion along the outer dimension of outer sleeve 28. A clamp 44 fixes slide 42 at variable positions along the longitudinal dimension of outer sleeve 28. According to one embodiment of the invention, slide 42 is an extruded "H" shaped section closed on the bottom by a member extending between the two parallel sides of the "H" section such that the bottom portion of slide 42 is a closed configuration sized to fit around outer sleeve 28 with sufficient clearance to move or slide axially relative to outer sleeve 28 as indicated by double-pointed arrow 32, similar to inner arm 30. Clamp 44 is, for example, a threaded member, commonly referred to as a set bolt or set screw, turned into a mating threaded hole in the closed bottom portion of slide 42 and clamping slide 42 in a variable fixed position along the longitudinal dimension of outer sleeve 28 by a frictional force exerted by the end of threaded clamp 44 against the surface of outer sleeve 28. Slide 42 further includes a second pivot mechanism 46 at the open end of the "H" section extending away from the body of telescoping arm 24 and securing a telescoping support strut 48, described in detail below.

According to another embodiment of the invention, slide 42 is a bent or extruded "U" shaped member secured to outer sleeve 28 of telescoping arm 24 by threaded clamp 44. According to this embodiment, threaded clamp 44 is, for example, a threaded bolt screwed into a threaded hole in the bottom portion of "U" shaped slide 42 extending between the two parallel leg portions. The position of slide 42 is adjusted along the longitudinal dimension of outer sleeve 28 by aligning the threaded hole in the bottom portion of "U" shaped slide 42 with a corresponding hole or depression in outer sleeve 28 and turning threaded clamp 44 into the threaded hole in the bottom portion of "U" shaped slide 42 and simultaneously into the corresponding hole or depression in outer sleeve 28. The parallel legs of "U" shaped slide 42 are longer than the thickness of outer sleeve 28 and extend beyond that side of outer sleeve 28 opposite clamp 44. A second pivot mechanism 46 is included at the open end of the "U" section extending away from the body of telescoping arm 24 where support strut 48 is secured in axial relationship with telescoping arm 24.

Support strut 48 extends between slide 42 and a third pivot mechanism 50 fixed to one surface of second frame bracket 20. Third pivot mechanism 50 projects away from the vehicle frame. Third pivot mechanism 50 is, according to one embodiment of the invention, formed integrally with second frame bracket 20. Third pivot mechanism 50 suspends, or anchors, one end of strut 48 for rotational motion relative to second frame bracket 20 and, consequently, to the frame of the vehicle. The end of strut 48 opposite second frame bracket 20 is suspended, or anchored, by second pivot mechanism 46 on slide 42. Thus, strut 48 provides columnar support to restrict telescoping arm from rotating upwardly toward the underside of the vehicle when a load is secured to the vehicle by a tension member coupled to tie down 10 at mounting mechanism 40 on foot 38. The suspension provided by both second pivot mechanism 46 and third pivot mechanism 50 allows strut 48 to rotate relative to each pivot mechanism 46, 50 when the position of slide 42 is adjusted relative to telescoping arm 24. According to one embodiment of the invention, strut 48 is a configured as a telescoping strut having an outer sleeve and an inner arm adjustable in axial relationship to one another. Telescoping strut 48' is configured generally consistently with telescoping arm 24 described above, including a mechanism for fixing the inner arm in a desired relative axial position with the outer sleeve.

FIG. 4 illustrates the spaced apart, mutually perpendicular relationship of first and second frame brackets 12 and 20 as installed on the vertical and horizontal portions of the vehicle frame, respectively. As described above, first and second frame brackets 12 and 20 are secured to the vertical and horizontal portions of the vehicle frame, respectively, using fasteners threaded through pre-existing mounting holes on the vehicle frame provided by the original manufacturer such that no drilling of the vehicle frame is needed for installation. FIG. 4 also illustrates in phantom retractable frame mounted tie down 10 in a retracted configuration, whereby tie down 10 is retracted entirely beneath the vehicle body such that it does not interfere with use of the vehicle when the load is not present. Telescoping strut 48 in a collapsed configuration (not shown) draws tie down 10 into a yet more compact form in a closer relationship with the vehicle undercarriage.

FIG. 4 illustrates, in solid lines, tie down 10 in an extended configuration securing a load, for example a camper, on the vehicle. According to one preferred embodiment, a shock absorber 52 is rotatably suspended from universal mounting mechanism 40 of foot 38 of inner arm 30 (best shown in FIG. 5). An adjustable tension member 54 is pliantly suspended from a universal connector portion 56 of shock absorber 52. Adjustable tension member 54 typically includes a suitable tensile device 58 and a tensioning device 60 used in adjusting tension member 54. Tensile device 58 is, for example, a chain (shown), cable, rod, braided wire or other suitable tensile device and tensioning device 60 is, for example, a turn-buckle or other suitable device for tightening tension member 54 to a desired degree. Shock absorber 52 relieves the stress on tie downs 10, bolts 16, and the vehicle frame when, for example, travel across uneven terrain tends to induce shock and/or vibration loads on tie downs 10 due to rocking of the load or other relative movement between the load and the vehicle. Thus, shock absorber 52 protects tie downs 10 and the vehicle frame from shock and vibration induced damage in contrast to the more rigid prior art devices.

Figure 5:
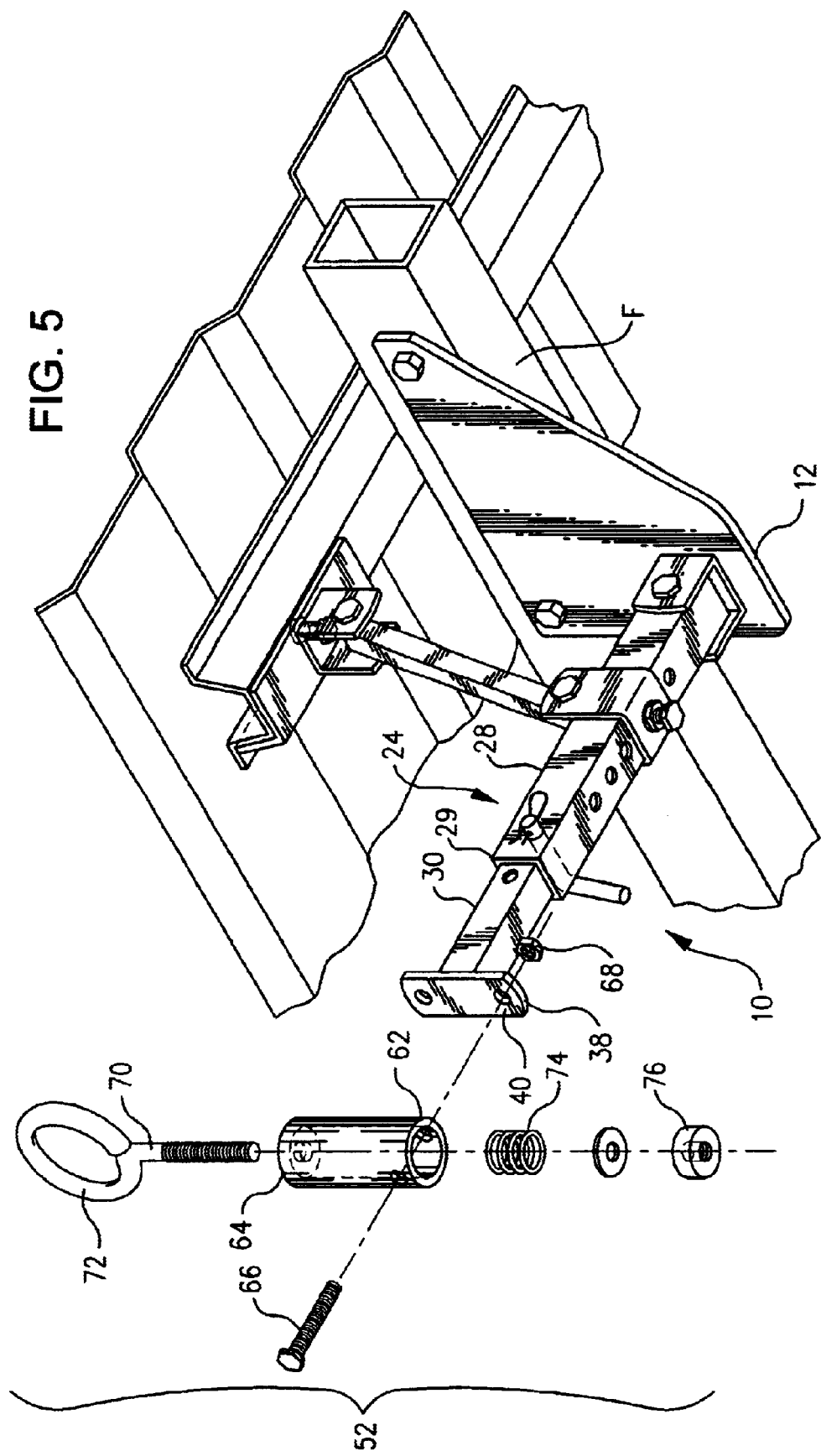
FIG. 5 shows an exploded view of an exemplary embodiment of the shock absorber portion of the present invention, utilizing a universal mounting mechanism on the retractable frame mounted tie downs.

FIG. 5 shows an exploded view of one exemplary embodiment of shock absorber 52 and its rotatable suspension from universal mounting mechanism 40 of foot 38 of inner arm 30. According to the embodiment illustrated in FIG. 5, shock absorber 52 includes a tubular sleeve 62 rotatably mounted to inner arm 30 at foot 38 by a pivot mechanism, for example, a bolt 66 and nut 68 (shown), a clevis pin, or another suitable mechanism whereby shock absorber 52 is rotatably secured to inner arm 30. Sleeve 62 includes a cap 64 (shown in phantom) formed at one end opposite the pivotal connection to inner arm 30. A hanger 70 extends through end cap 64 and includes a universal connector end 72 for rotatably suspending tension member 54 (shown in FIG. 4) securing a load to the vehicle. The end of hanger 70 opposite universal connector 72 extends into sleeve 62 and is configured to compress a cushion 74, for example a spring (shown) or other suitable cushion device between end cap 64 and a fastener 76 secured to the end of hanger 70. Cushion 74 performs the shock and vibration absorbing function of shock absorber 52 by maintaining a predetermined tensile force on tension member 54 while providing sufficient clearance between end cap 64 of sleeve 62 and fastener 76 when subjected to momentary severe tensile loads.

Those of ordinary skill in the art will readily recognize that the embodiment of shock absorber 52 illustrated in the various figures of the drawing and described herein is not intended to limit the scope of the invention and that other configures of the various components are within the skill of one of ordinary skill to design. For example, in FIG. 5, hanger 70 is shown as an eyebolt, but the invention contemplates other hanger configurations adapted to rotatably suspend tension member 54 at one end and adapted to accept a fastener at the other end. For example, universal connector end 72 of hanger 70 is alternatively configured as an open hook while the threads on the opposing end are alternatively replaced by a smooth shaft pierced by a number of holes for inserting pins at various positions along the shaft's longitudinal dimension whereby cushion 74 is pre-compressed to a greater or lesser degree. In another example, the passage in end cap 64 through which the shaft of hanger 70 passes is alternatively threaded whereby fastener 76, for example a lock nut, is fixed relative to the end of hanger 70 and cushion 74 is pre-compressed to a greater or lesser degree by turning the threaded shaft of eyebolt hanger 70 which increases or decreases the dimension between end cap 64 and lock nut fastener 76. In yet another example, tubular sleeve 62 is alternatively shaped with a square or rectangular cross-section. According to another alternative embodiment, tubular sleeve is replaced by a "U" shaped member wherein the structure of end cap 64 is provided by the portion extending between the two parallel legs of the "U" shaped structure and shock absorber 52 is rotatably mounted to inner arm 30 at foot 38 by a pivot mechanism extending through the ends of the two parallel legs opposite end cap 64.

According to the exemplary embodiment illustrated in FIG. 5, first and second frame brackets 12 and 20 are configured to adapt to the frame of an embodiment of a 1999 model pick-up truck manufactured by the Ford Motor Company and to mate with pre-existing mounting holes formed in the vehicle vertical and horizontal frame portions, respectively.

Figure 6:
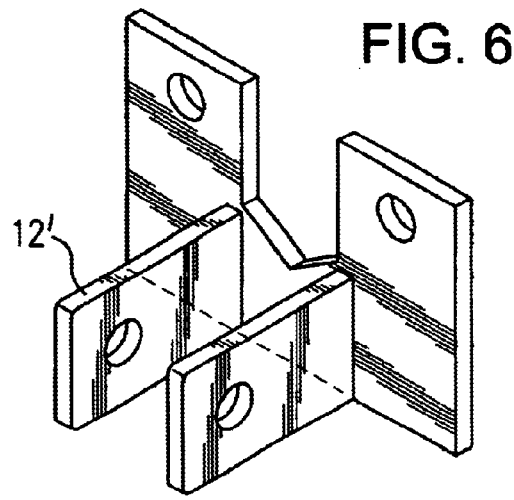
FIG. 6 illustrates one embodiment of a frame bracket portion of the retractable frame mounted tie downs, as adapted to mate with pre-existing mounting holes in the frame of one configuration of vehicle available from one manufacturer, other embodiments of the frame bracket portions of the invention (not shown) are similarly adapted to mate with pre-existing mounts available on the frame and undercarriage of other vehicles available from other manufacturers.
Figure 7:
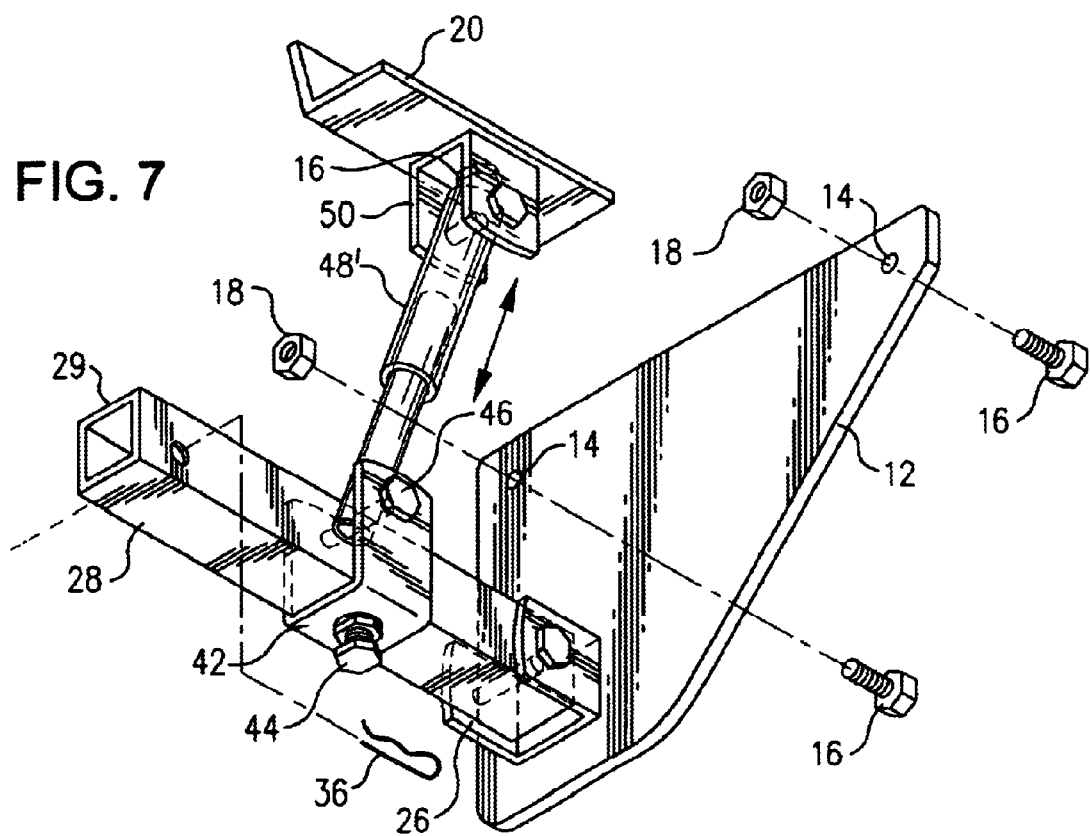
FIG. 7 illustrates one exemplary embodiment of the frame bracket, with extensible mount, utilizing an adjustable mounting mechanism on the tie down arm to locate it as it extends outward from the frame bracket.

FIG. 6 illustrates one embodiment of a first frame bracket 12' adapted to mate with pre-existing holes in the frame of one configuration of a 1999 Dodge pick-up truck. Other embodiments of first and second frame brackets 12 and 20 of the invention are similarly adapted to mate with pre-existing mounts available on the frame and undercarriage of other vehicles available from other manufacturers.

Thus, in the various embodiments of the invention, each embodiment as manufactured for a particular make and/or model is configured to mate with pre-existing mounting holes of a different vehicle frame without need for drilling holes or otherwise modifying the vehicle frame. Because no frame modifications are required for installation, the drill-less retractable frame mounted tie downs of the present invention require neither special tools nor expertise for installation. Nor does the installation of the drill-less retractable frame mounted tie downs of the present invention violate or void the warranties provided by many vehicle manufacturers by the addition of such holes in the vehicle frame.

Figure 8:
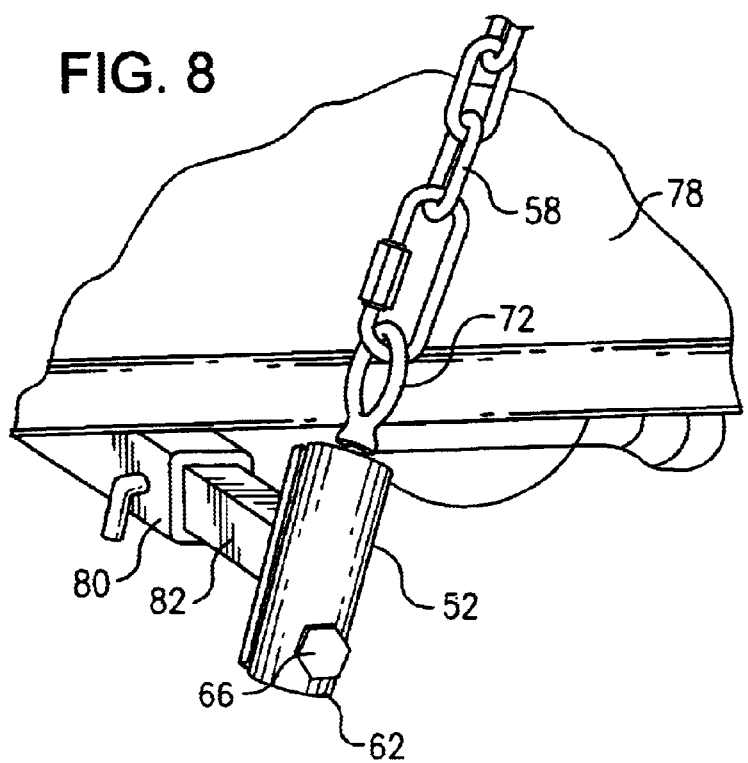
FIG. 8 illustrates, in use on a vehicle, the mounting bracket, tie-down load bearing arm, and shock absorber mount just illustrated in FIG. 5 above.

Attention is now directed to FIG. 8, which illustrates, in use on a vehicle 78, an interior load bearing arm 80 having a insertable outer arm 82, and having a shock absorber 52 mount.

Figure 9:
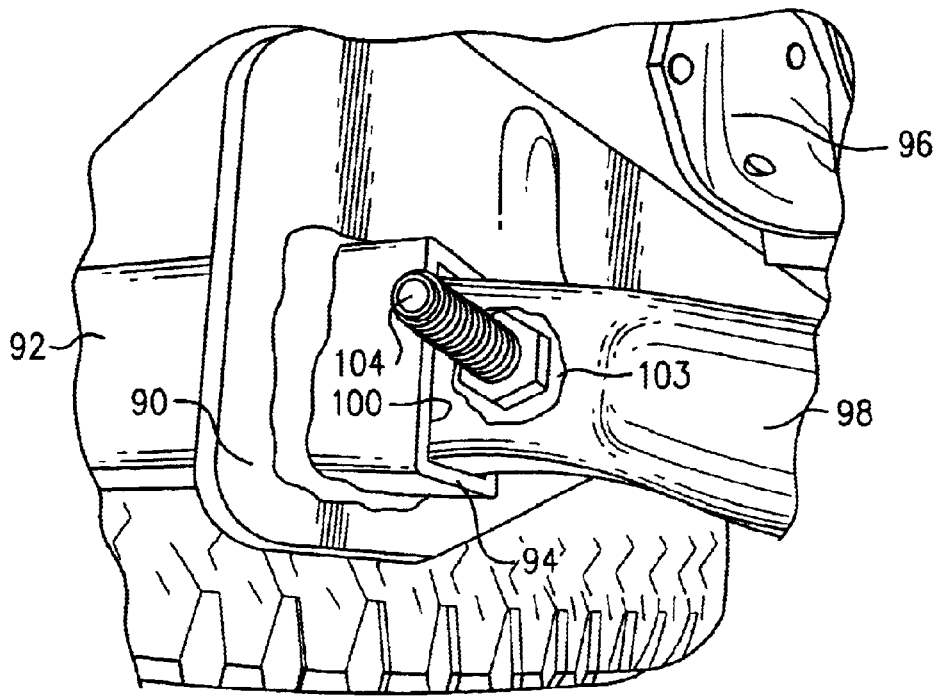
FIG. 9 shows the use of a trailer hitch transverse rear tube to accept an appropriately crimped first end of a load bearing arm, and showing the stud for use in securing a mounting clamp.
Figure 10:
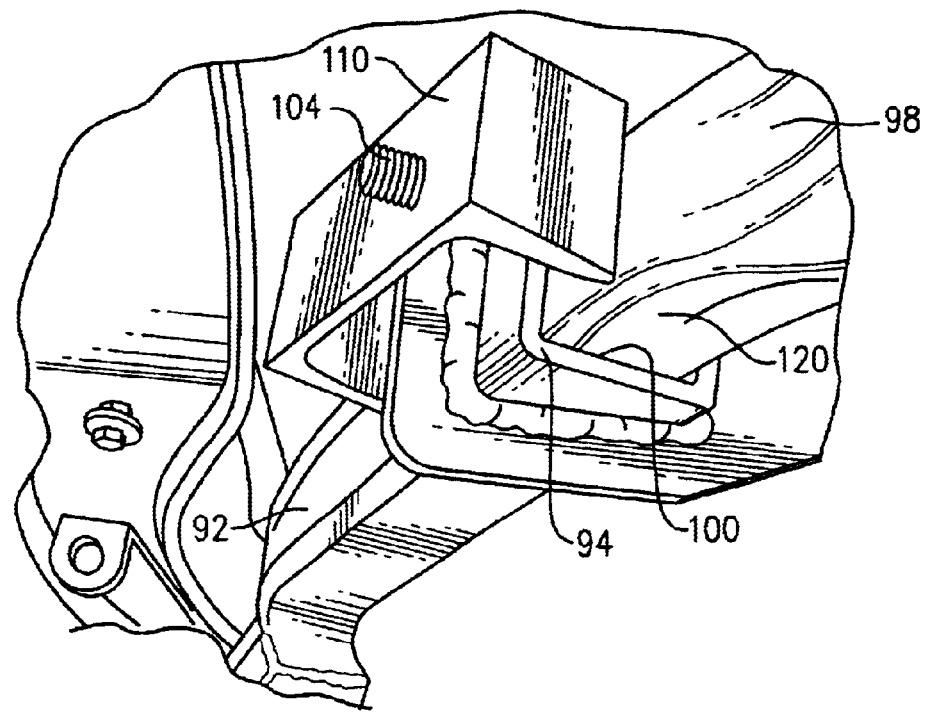
FIG. 10 is a view similar to the view just illustrated in FIG. 9 above, now adding a clamp to be affixed by the fastener system of the stud first shown in FIG. 9 and a selected nut to be further illustrated in FIG. 11 below.
Figure 11:
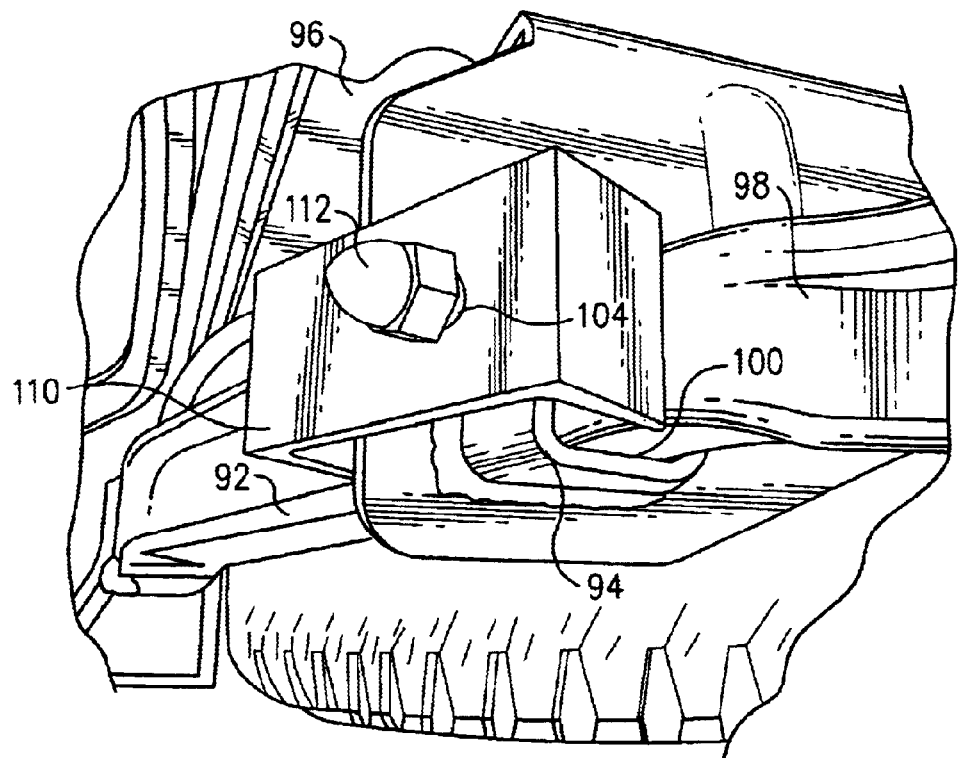
FIG. 11 is a view similar to the view just illustrated in FIGS. 9 and 10 above, now adding an acorn nut be affixed to finalize the fastener system and thus securely affix the load bearing arm to the hitch.

Turning then to FIGS. 9, 10, and 11, a trailer hitch 90 is provided having a transverse rear tubular portion 92. A first end 94 of transverse rear tubular portion is open. A second end (not shown) is likewise available on the other side of vehicle 96. An exemplary load bearing exterior arm 98 is provided, having a first end 99 crimped (not visible, see FIG. 12) adapted for snug interfitting engagment within interior wall 100 of transverse rear tubular portion 92. The arm 98 fits into the tubular portion 92 for a distance $L_T$ (see FIG. 12) that is basically defined by the distance between the end 102 of arm 98 and the weldment 103 surrounding fastener stud 104.

Turning now to FIG. 10, this is similar to FIG. 9, but now shows the use of a U-shaped clamp 110 being affixed by the fastener system including the stud 104 first shown in FIG. 9, and a selected nut such as acorn type nut 112 shown in FIG. 11. Also, note particularly the crimped region 120 in arm 98.

Figure 14:
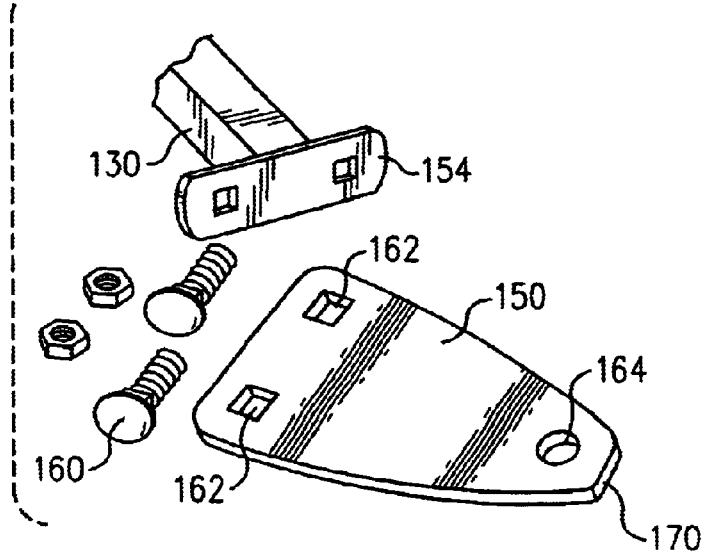
FIG. 14 illustrates the bullet shaped mounting plate, before attachment to the mounting foot of the tubular load bearing end piece.
Figure 15:
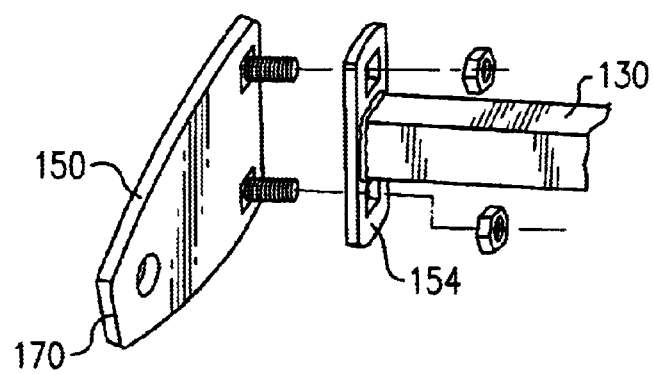
FIG. 15 illustrates the mounting of the bullet shaped mounting plate being affixed to the mounting foot of the tubular load bearing end piece.
Figure 16:
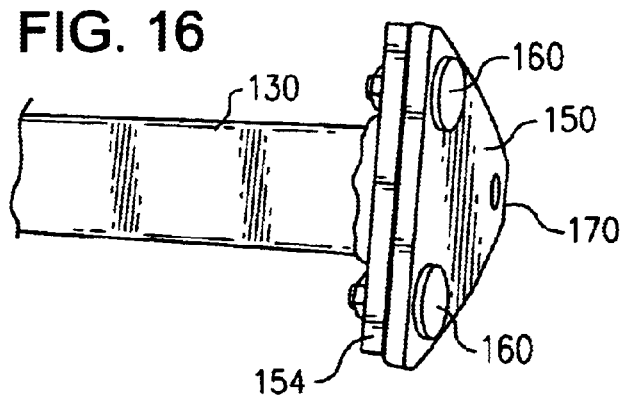
FIG. 16 shows the bullet shaped mounting plate affixed to the mounting foot of the tubular load bearing end piece.

In FIG. 12, an exemplary load bearing arm 98 is shown, but now removed from the transverse rear tube 92 of hitch 90, and more clearly showing the first, interior end which is crimped and shaped to slidingly and snugly interfit into the transverse rear tube 92. In FIG. 13, the load bearing arm 98 just illustrated in FIG. 12 is again shown, but now additionally shows the use of a tubular load bearing exterior or end piece 130 having a first, interior end 132 (not seen) adapted to insert and snugly fit in close fitting relationship to the interior tubular wall 134 of the second, exterior end 136 of the load bearing interior arm 98. The load bearing arm 98 and the tubular load bearing end piece 130 are secured together with a conventional pin 140 and transverse cotter pin 142. At the second, exterior end 144 of the tubular load bearing end piece 130, a bullet (shaped as if the bullet were cross-sectioned) mounting plate 150, is affixed to the mounting foot 152 of the tubular load bearing end piece 130. As illustrated, a mounting foot 154 is utilized. Suitable fasteners 160 may be utilized to accomplish this task. Preferably, bullet plate 150 has a pair of mounting apertures defined by edge walls 162 (preferably square) for use in connection of bullet plate 150 to the foot 154. Also, bullet plate has a receiving aperture defined by edge wall 164 for attachment of a suitable chain 58. In FIG. 14, the bullet plate 150 is illustrated before attachment to the mounting foot 154 of the tubular exterior load bearing arm 98. FIG. 15 illustrates the mounting of the bullet plate 150 to the mounting foot 154. FIG. 16 shows the bullet plate 150 affixed to the mounting foot 154 of the tubular exterior load bearing arm 98.

Figure 17:
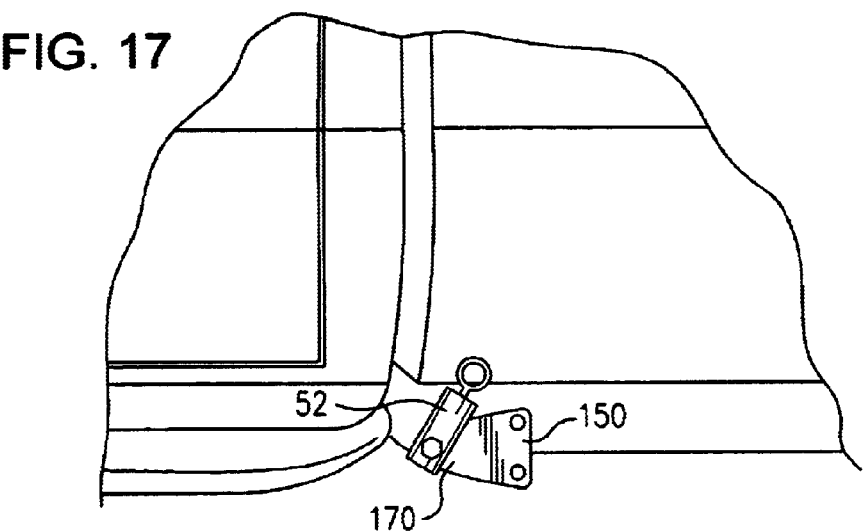
FIG. 17 illustrates the correct mounting orientation of the bullet shaped end piece, with the pointed end directed forward, in order to decrease the angle of the tie down chains with respect to the horizontal (; i.e., stretch the lower end of the forward chains more forward on the vehicle).
Figure 18:
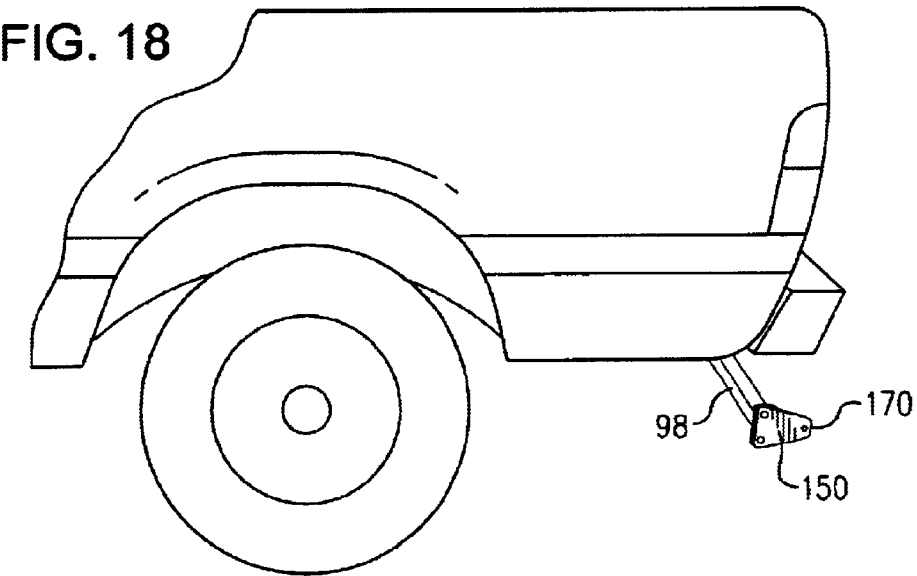
FIG. 18 illustrates the correct mounting orientation of the bullet shaped end piece, with the pointed end directed rearward, in order to decrease the angle of the tie down chains with respect to the horizontal (; i.e., stretch the lower end of the rear chains more rearward on the vehicle).

Turning now to FIG. 17 this figure illustrates the correct mounting orientation of the bullet plate 150 with the pointed end 170 directed forward, in order to decrease the angle of the tie down chains with respect to the horizontal (; i.e., stretch the lower end of the forward chains 58 more forward on the vehicle). Likewise, FIG. 18 illustrates the correct mounting orientation of the bullet plate 150, with the pointed end 170 directed rearward, in order to decrease the angle of the tie down chains 58 with respect to the horizontal (; i.e., stretch the lower end of the rear chains 58 more rearward on the vehicle).

Figure 19:
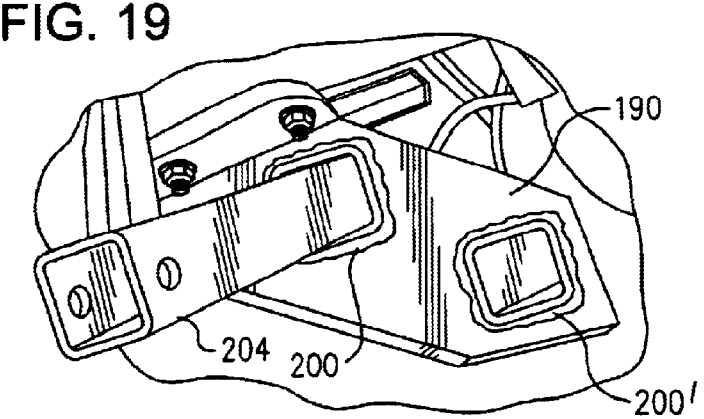
FIG. 19 illustrates the use of a transverse rear hitch tube to accept an appropriately crimped end of a load bearing arm.
Figure 20:
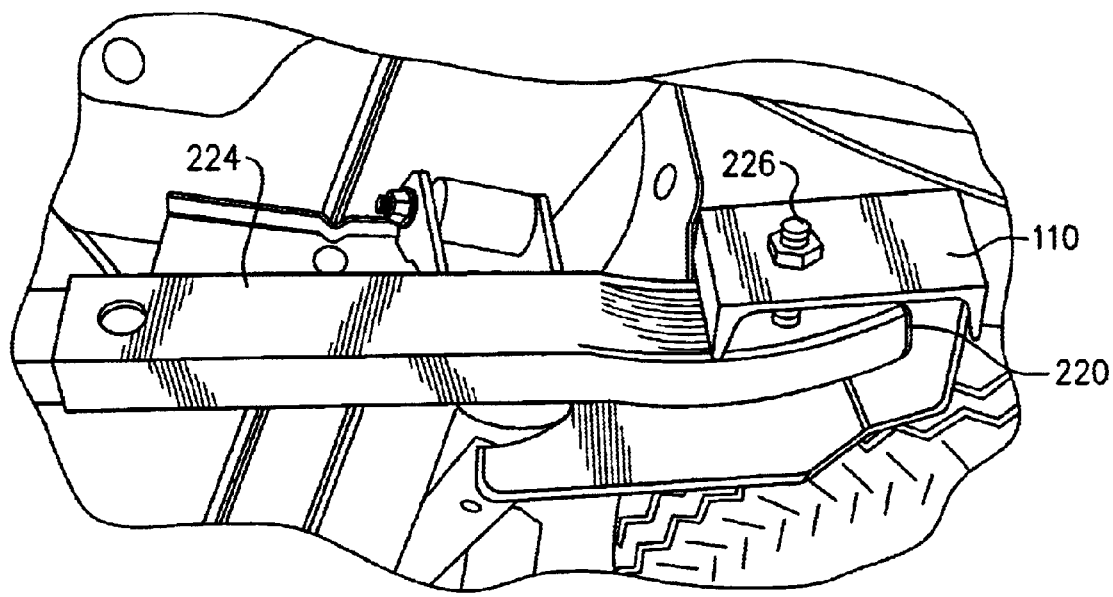
FIG. 20 further illustrates the use of a transverse rear hitch tube to accept an approriately crimped first end of the load bearing arm.

FIG. 19 illustrates the use of a transverse rear hitch tube 200 of hitch 190 to accept an appropriately crimped end 202 of an interior load bearing arm 204. Second transverse rear hitch tube 200' need not be used. In FIG. 20, further illustration of the use of a transverse rear hitch tube 220 to accept an approriately crimped first end 222 (not seen) of the interior load bearing arm 224. Nut 226 is seen, although the acorn style nut earlier discussed is preferred.

Figure 21:
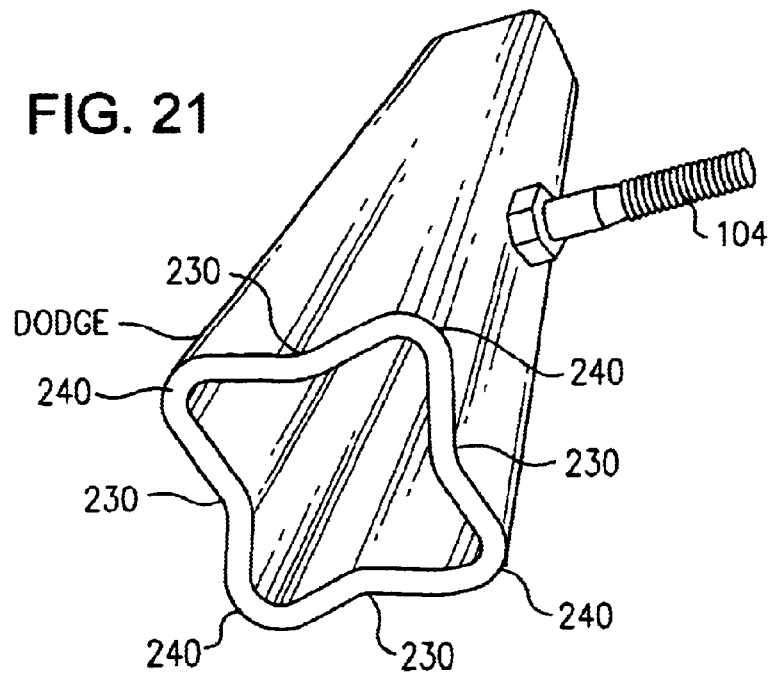
FIG. 21 shows the first end of an appropriately crimped load bearing arm, sized and shaped for use on a typical Dodge pickup truck trailer hitch.

Turning now to FIG. 21, this illustrates in great detail the dimensions of a crimped tubular member such interior load bearing arms 98, wherein the first or interior end is crimped 230 intermediate of the corners 240. This shape is one embodiment that is appropriately crimped, sized and shaped for use on a typical Dodge pickup truck trailer hitch.

Figure 22:
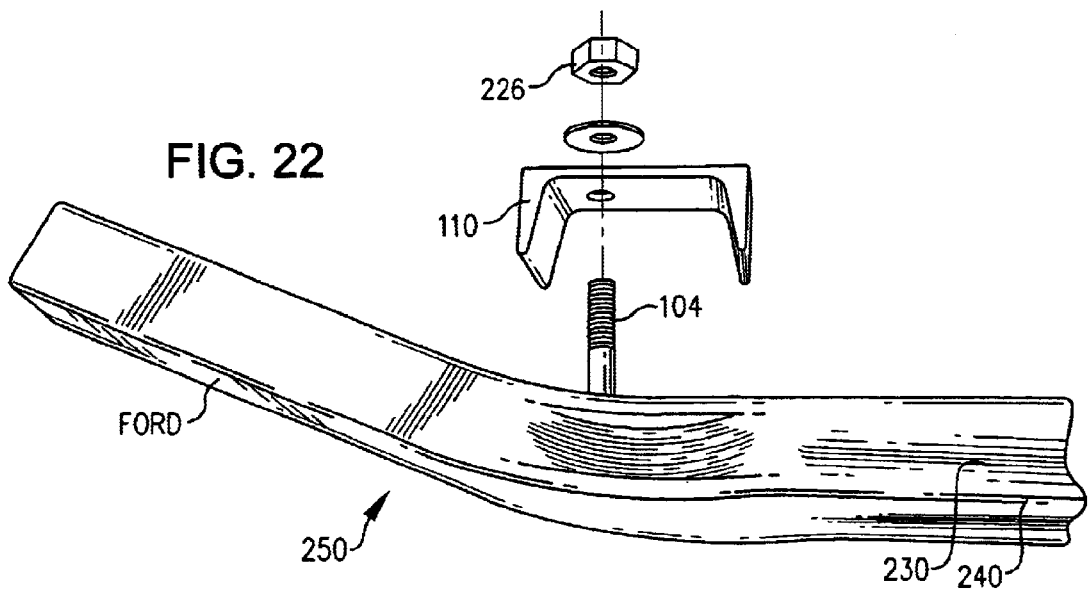
FIG. 22 illustrates a load bearing arm, much like that shown in FIG. 21, but this one is sized and shaped to fit a typical Ford pickup truck trailer hitch.

Similarly, FIG. 22 illustrates a load bearing arm 250, much like that shown in FIG. 21, but this one is sized and shaped to fit a typical Ford pickup truck trailer hitch. Similar crimps 230 and corners 240 are noted.

Figure 23:
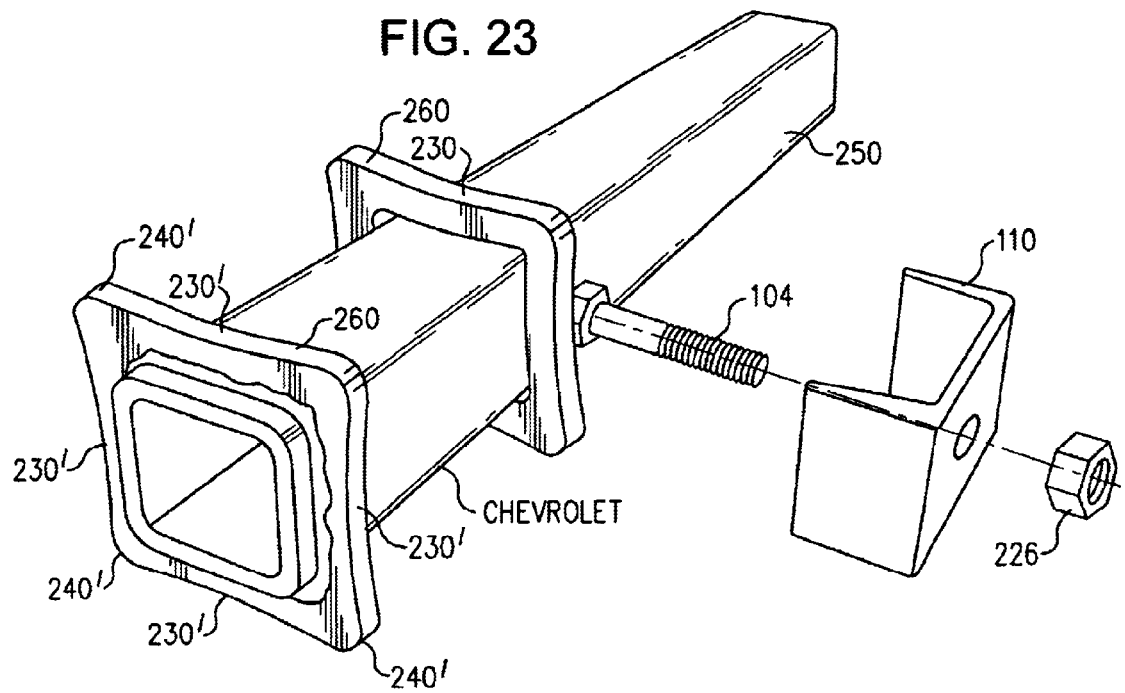
FIG. 23 illustrates yet another embodiment of a load bearing arm, sized and shaped to fit the interior of a typical Chevrolet pickup truck trailer hitch, and especially showing the use of a pair of "crimped" receiver inserts, each of which has a centrally located edge indented portion with respect to the line formed below the line connecting two selected corners; the inserts are sized and shaped to fit the interior of a trailer transverse rear tube, and avoid the weldment at the seam used to join the hitch tube.
Figure 24:
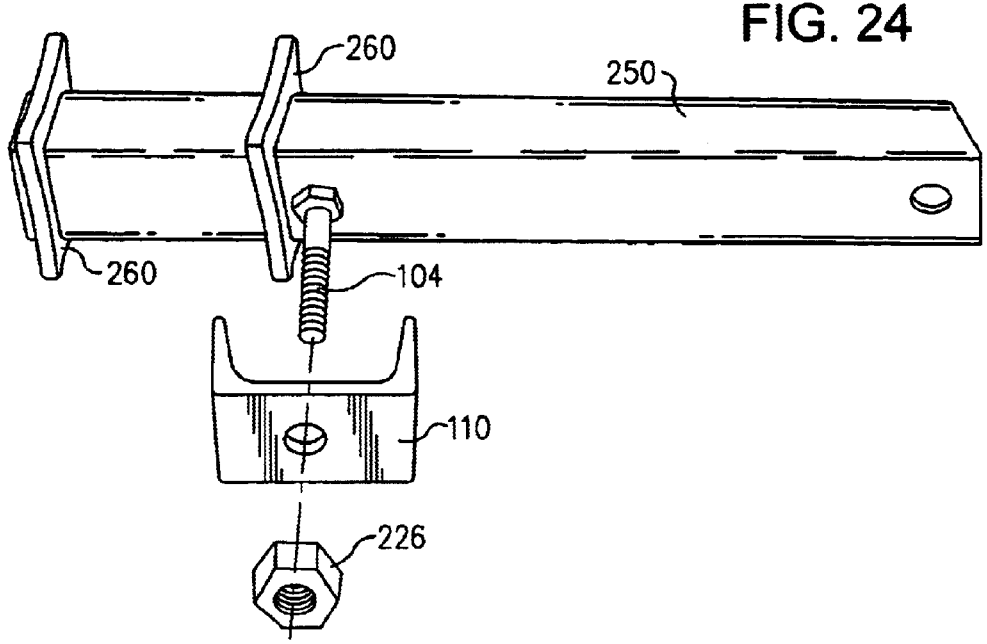
FIG. 24 is a side perspective view of the load bearing arm just illustrated in FIG. 23 above.
Figure 25:
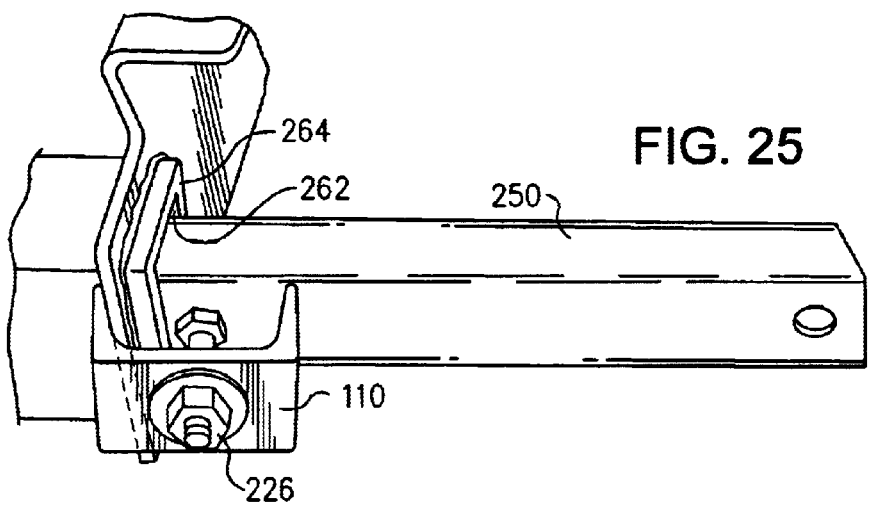
FIG. 25 is a perspective view of the load bearing arm just illustrated in FIGS. 23 and 24 above, but now showing the arm mounted in the rear transverse tube of a typical trailer hitch, and with the U-shaped clamp installed to secure the load bearing arm.
Figure 26:
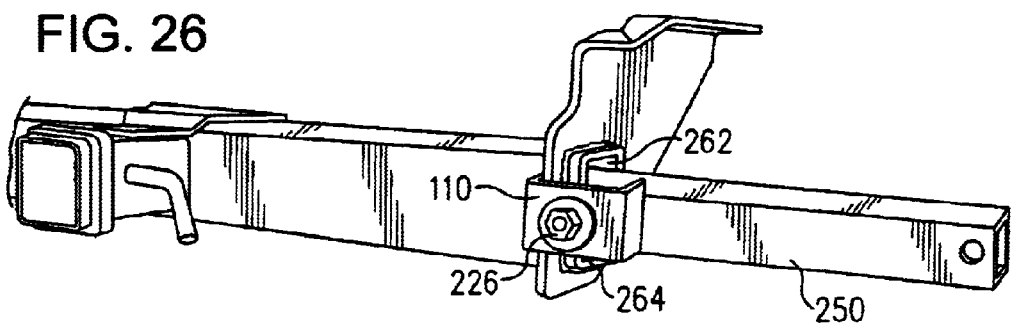
FIG. 26 is yet another perspective of the load bearing arm just illustrated in FIG. 25 above, showing additional perspective of the rear transverse hitch tube and the hitch receiver. 23 and 24 above, but now showing the arm mounted in the rear transverse tube of a typical trailer hitch, and with the U-shaped clamp installed to secure the load bearing arm.

FIG. 23 illustrates yet another embodiment of a load bearing arm 250, sized and shaped to fit the interior of a typical Chevrolet pickup truck trailer hitch, and especially showing the use of a set (normally but not necessarily a pair) of "crimped" receiver insert plates 260, each of which has a centrally located edge indented portion 230' with respect to the line formed below the line connecting two selected corners 240'. The inserts 260 are sized and shaped to fit the interior sidewall 262 of a trailer transverse rear tube 264, and avoid the weldment at the seam S used to join the hitch tube, as seen in FIG. 33.

Figure 27:
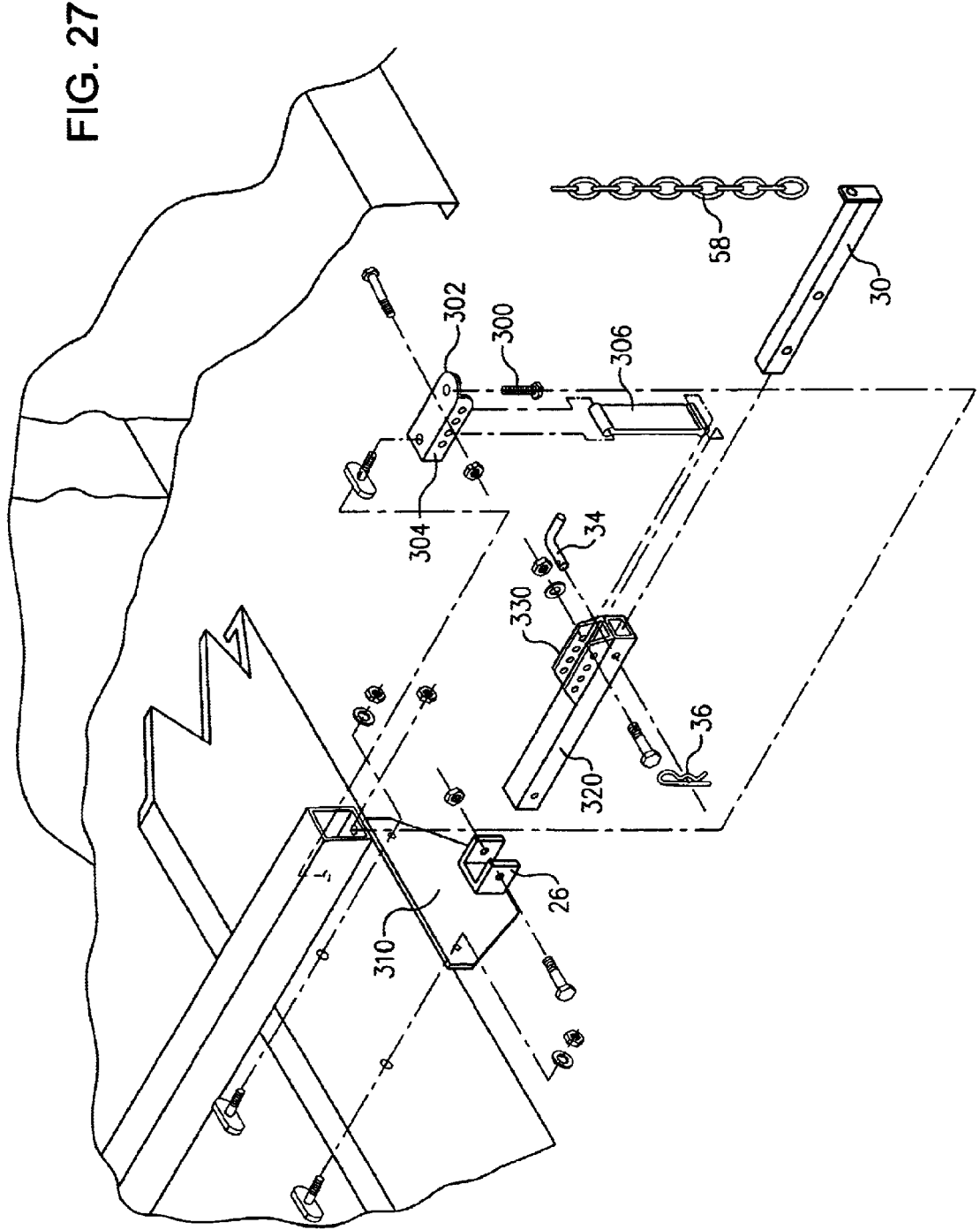
FIG. 27 is an exploded perspective schematic showing the various components of one exemplary embodiment of a front tie down assembly having adjustable strut locations.
Figure 28:
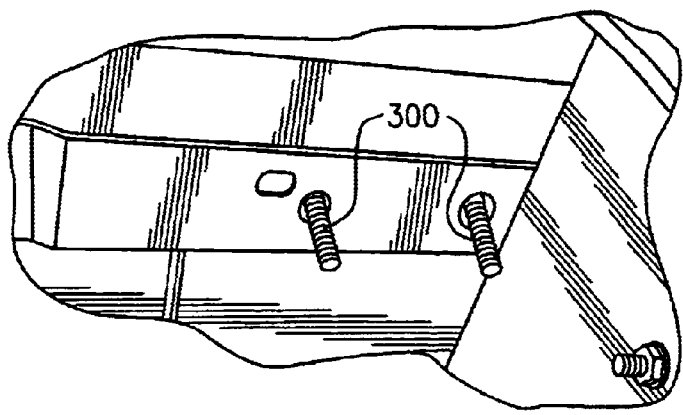
FIG. 28 illustrates the first step in installing the front tie-down assembly just shown in FIG. 27, wherein fasteners are prepared to receive the passenger side front adjustable mounting bracket.
Figure 29:
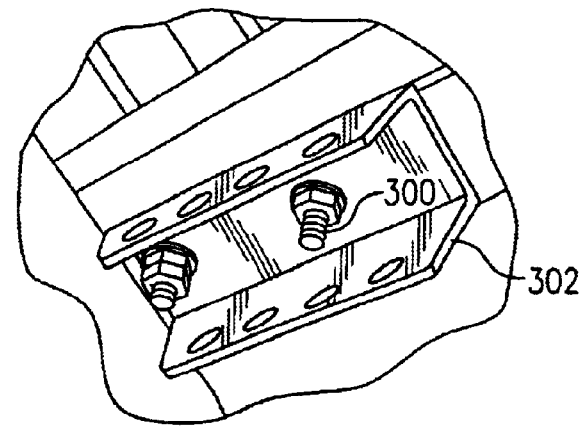
FIG. 29 illustrates the second step in installing the front tie-down assembly just shown in FIG. 27, wherein the passenger side front upper adjustable transverse mounting bracket is secured in place by fasteners.
Figure 30:
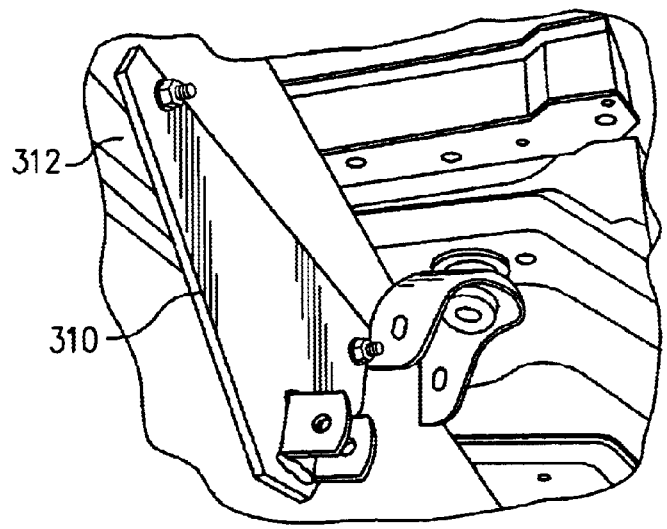
FIG. 30 shows the third step of the installation of the passenger side front mounting bracket, wherein the first axial mounting bracket is affixed to the frame.
Figure 31:
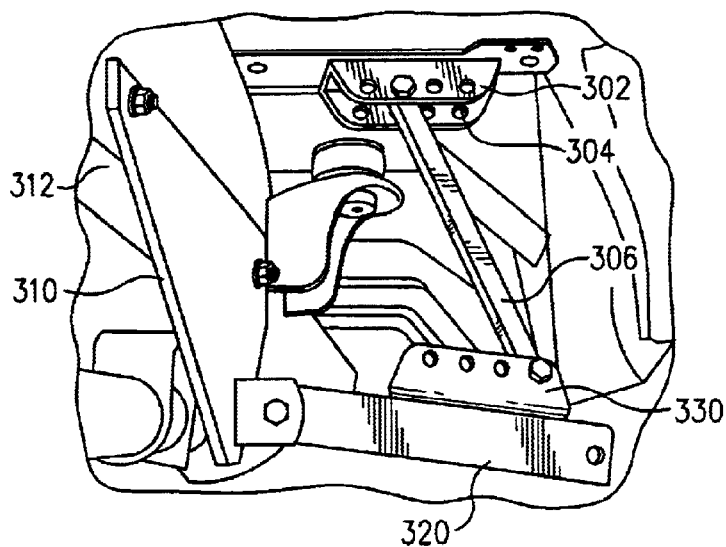
FIG. 31 shows the next step in the installation of the passenger side front mounting bracket, wherein the first load bearing arm is secured to the first axial mounting bracket, and wherein the passenger side front lower adjustable transverse mounting bracket is secured in place , with the strut running between the adjustable upper and adjustable lower transverse brackets.

Turning now to FIG. 27, an exploded perspective schematic showing the various components of one exemplary embodiment of a front tie down assembly having adjustable strut locations is illustrated. These elements are better seen in subsequent figures, wherein FIG. 28 illustrates the first step in installing the front tie-down assembly just shown in FIG. 27, wherein fasteners 300 are prepared to receive the passenger side front adjustable mounting bracket 302. The adjustable mounting bracket has a plurality of holes 304 therein for adjustable strut 306 utilization. FIG. 29 illustrates the second step in installing the front tie-down assembly just shown in FIG. 27, wherein the passenger side front upper adjustable transverse mounting bracket 302 is secured in place by fasteners 300. FIG. 30 shows the third step of the installation of the passenger side front mounting bracket, wherein the first axial mounting bracket 310 is affixed to the frame 312. FIG. 31 shows the next step in the installation of the passenger side front mounting bracket, wherein the first load bearing arm 320 is secured to the first axial mounting bracket 310, and wherein the passenger side front lower adjustable transverse mounting bracket 330 is secured in place, with the adjustable strut 306 running between the adjustable upper 302 and adjustable lower 330 transverse brackets.

Figure 32:
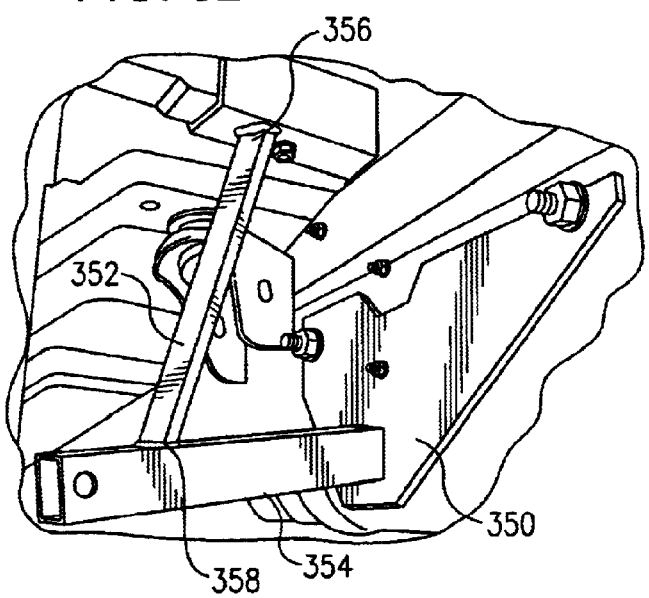
FIG. 32 illustrates yet another embodiment of a second axial mounting bracket, affixed on the drivers side, and which has been configured for a fixed length, non-adjustable strut, and a fixed upper transverse mounting point, and a fixed lower transverse mounting point.

Turning to FIG. 32 yet another embodiment of a second axial mounting bracket 350, affixed on the drivers side, is illustrated. This configuration has been adopted for a fixed length, non-adjustable strut 352, and a fixed interior load bearing arm 354, as well as a fixed upper transverse mounting point 356, and a fixed lower transverse mounting point 358.

Figure 33:
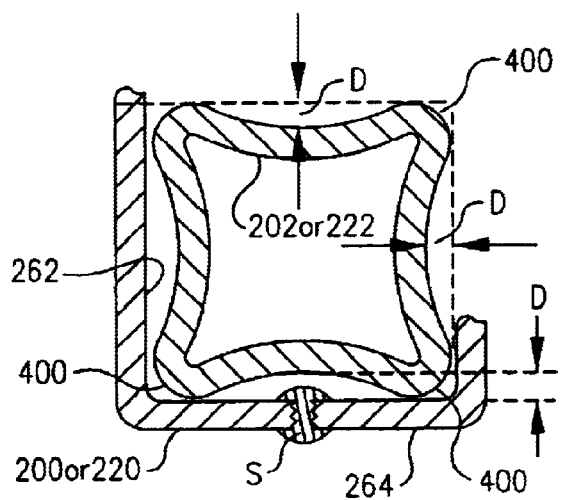
FIG. 33 provides additional detail of an exemplary cross-section of a "crimped" tubular member as taught herein, showing a portion of an outer tubular member, such as a transverse rear hitch tube having a weld joint at the bottom thereof, and an insert, "crimped" second tubular end portion inserted therein, and where a clearance D is provided outward of the central portion of one or more of the tubular sides, with respect to the line formed between adjacent corners of the crimped member.

Finally, FIG. 33 provides additional detail of an exemplary cross-section of a "crimped" tubular member 202 or 222, as taught herein, showing a portion of an outer tubular member, such as a transverse rear hitch tube 200, 220, or 264, having a weld joint S at the bottom thereof, and the "crimped" second tubular end portion 202 or 222 inserted therein, and where a clearance D is provided outward of the central portion of one or more of the tubular sides, with respect to the line formed between adjacent corners 400 of the crimped member 202 or 222.

It is to be appreciated that the various aspects and embodiments of the camper tie down designs described herein are an important improvement in the state of the art, especially for camper tie-down applications. Although only a few exemplary embodiments have been described in detail, various details are sufficiently set forth in the drawings and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

I claim:

1. A tie down system for securing an object to a pre-existing mounting structure on a motor vehicle, said pre-existing structure comprising a frame and a trailer hitch having a transverse tubular rear portion having an interior sidewall, said tie down system comprising:

(a) a first frame bracket, said first frame bracket adapted to mate with said pre-existing mounting structure on a motor vehicle;

(b) a first interior load bearing arm and a first exterior load bearing arm, said first interior load bearing arm projecting from said first frame bracket to a distal end, said first exterior load bearing arm interfitting with and adjustably affixed to, along a longitudinal axis, said first interior load bearing arm;

(c) a second frame bracket, said second frame bracket adapted to mate with said pre-existing mounting structure on a motor vehicle;

(d) a support strut, said support strut extending between said second frame bracket and said first interior load bearing arm, (e) a second interior load bearing arm and a second exterior load bearing arm, said second interior load bearing arm having a first, interior end sized and shaped for snug interfitting engagement with said interior sidewall of said transverse tubular rear portion of said hitch, and a distal end sized and shaped for interfitting with and attachment to, along a longitudinal axis, said second exterior load bearing arm.

2. The apparatus as set forth in claim 1, further comprising a bullet mounting plate, said bullet mounting plates having a first end, said first end securely affixed to one of said first or said second exterior load bearing arms, and, displaced either forwardly or rearwardly from said first end of said bullet mounting plate, an attachment point for affixing a load bearing chain, directly or indirectly, to said bullet mounting plate.

3. The apparatus as recited in claim 1, wherein said first interior load bearing arm is adjustably affixed to said first frame bracket.

4. The apparatus as recited in claim 1, wherein said first, interior end of said second interior load bearing arm is nested in said transverse tubular rear hitch portion of said trailer hitch, and wherein said second interior load bearing arm is adjustable with respect to said transverse tubular rear hitch portion along a common longitudinal axis.

5. The apparatus as recited in claim 1, wherein said second interior load bearing arm comprises a square tubular arm having sidewall portions between each of four corners.

6. The apparatus as set forth in claim 5, wherein said second interior load bearing arm is crimped inward along a portion of its sidewall portions from its interior end, so as to facilitate sliding engagement within said transverse tubular rear hitch portion of said trailer hitch.

7. The apparatus as recited in claim 1, further comprising a slide adapted for axial motion along said first interior load bearing arm, said slide including a clamp securing said slide at a variable position relative to said first interior load bearing arm, and wherein a first end of said support strut is pivotally secured to said clamp and a second end of said support strut opposite said first end is pivotally suspended from said second frame bracket.

8. The apparatus as recited in claim 7, wherein said support strut comprises a telescoping support strut, said telescoping support strut including an inner arm fixable in axial relationship with an outer sleeve of said telescoping support strut.

9. The apparatus as recited in claim 1, further comprising a universal mounting mechanism attached to said exterior end of said first or said second exterior load bearing arm.

10. The apparatus as recited in claim 9, further comprising a shock absorber rotatably affixed to said first or said second exterior load bearing arm.

11. The apparatus as recited in claim 10, wherein said shock absorber comprises:

a sleeve rotatably affixed to said universal mounting mechanism, said sleeve comprising
a cap formed at a first end;
a hanger extending through said cap, said hanger having first and second ends positioned on opposing sides of said cap;
a universal connector formed at said first end of said hanger,
said universal connector adapted for rotatably mounting an accessory; and
a compressible cushion located between said cap and said second end of said hanger.

12. The apparatus as recited in claim 11, wherein said compressible cushion is adjustably compressed between said cap and said second end of said hanger.

13. The apparatus as recited in claim 12, further comprising an adjustable tension member, said adjustable tension member rotatably mounted to said universal connector formed at said first end of said hanger.

14. The apparatus as set forth in claim 1, wherein said first and second frame brackets are spaced apart and mutually perpendicular.

15. The apparatus as set forth in claim 1, wherein said support strut is rotatably affixed to said first frame bracket.

16. The apparatus as set forth in claim 3, wherein said first exterior load bearing arm is (a) slidably nested in an axial relationship within said first interior load bearing arm, and (b) releasably affixed thereto.

17. The apparatus as set forth in claim 3, wherein said second exterior load bearing arm is (a) slidably nested in an axial relationship within said second interior load bearing arm, and (b) releasably affixed thereto.

18. The apparatus as recited in claim 16, wherein one end of said support strut is rotatably suspended from said second mounting bracket.

19. The apparatus as set forth in claim 3, further comprising a universal mount mechanism fixed at a second end of second exterior load bearing arm.

20. The apparatus as recited in claim 14, wherein each of said first and second frame brackets includes one or more through holes adapted to mate with pre-existing mounting structure on a vehicle frame.

21. The apparatus as recited in claim 20, further comprising a slide adapted for axial motion relative to said first interior load bearing arm, said slide including a fastener securing said slide at a variable position relative to said first interior load bearing arm, and wherein said support strut is rotatably suspended from said slide in variable axial relationship with said first interior load bearing arm.

22. The apparatus as recited in claim 21, wherein said support strut comprises a telescoping support strut, said telescoping support strut including an inner arm fixable in axial relationship with an outer sleeve of said telescoping support strut.

23. The apparatus as set forth in claim 14, further comprising a pivot mechanism affixed to said first frame bracket, and wherein said first interior load bearing arm is rotatably affixed to said first frame bracket for rotational motion in a plane essentially perpendicular to a plane defined by said first frame bracket.

24. The apparatus as set forth in claim 14, wherein said support strut secures said first interior load bearing arm in a fixed orientation with said first frame brackets, so as to maintain a fixed orientation with said second frame bracket.

25. The apparatus as recited in claim 23, further comprising: a movable slide, said movable slide including a clamp for adjustably securing said slide in fixed axial relationship with said first interior load bearing arm, said movable slide including a second pivot mechanism; and wherein said second frame bracket further comprises a third pivot mechanism projecting downwardly therefrom, and wherein said support strut comprises a first end rotatably suspended from said second pivot mechanism portion on said movable slide and a second end rotatably suspended from said third pivot mechanism portion on said second frame bracket.

26. The apparatus as set forth in claim 25, wherein said support strut further comprises a telescoping support strut.

27. The apparatus as set forth in claim 1, further comprising (a) a bullet plate affixed to a distal end of said first exterior load bearing arm, and (b) an adjustable tension member, said adjustable tension member mounted between said object and said bullet plate on said first exterior load bearing arm.

28. The apparatus as set forth in claim 1, further comprising (a) a bullet plate affixed to a distal end of said second exterior load bearing arm, and (b) an adjustable tension member, said adjustable tension member mounted between said object and said bullet plate on said second exterior load bearing arm.

29. The apparatus as set forth in claim 27, or in claim 28, further comprising a shock absorber, said shock absorber mounted between said bullet plate and said object.

30. The apparatus as set forth in claim 29, wherein said shock absorber comprises:
  a housing sleeve adjustably mounted to said distal end of said second exterior load bearing arm, said sleeve having an upper end with a cap portion;
  an upwardly extending hanger, said hanger having first and second ends positioned on opposing sides of said cap;
  a compressible spring, said compressible spring located between said second end of said hanger and said cap;
  so that said spring is compressed when tension force is applied to said first end of said hanger.

31. The apparatus as set forth in claim 30, wherein said housing sleeve is pivotally mounted to said bullet plate.

32. The apparatus as set forth in claim 1, further comprising an adjustably positionable slide having a clamp, said adjustably positionable slide located between said support strut and said first interior load bearing arm, said clamp adapted to secure said slide, and thus said support strut, to said first interior load bearing arm at a pre-selected adjustable position along said first interior load bearing arm.

33. The apparatus as set forth in claim 1, wherein each of said first and second frame brackets includes one or more apertures therethrough adapted to mate with a pre-existing mounting structure on a motor vehicle.

34. The apparatus as set forth in claim 1, wherein said second interior load bearing arm further comprises a mounting stud, said stud located a preselected distance from said interior end of said second interior load bearing arm.

35. The apparatus as set forth in claim 34, further comprising a clamp, and a nut, said clamp adapted for being secured to said stud by said nut in order to secure said second load bearing arm to said transverse rear tubular portion of said trailer hitch.

36. The apparatus as set forth in claim 1, further comprising a set of internal mounting plates, said set of internal mounting plates (i) affixed in a preselected spaced apart relationship to the exterior of said second interior load bearing arm, and (ii) sized and shaped for snug interfitting engagement with an interior sidewall of said transverse tubular rear hitch portion.

37. The apparatus as set forth in claim 36, wherein at least one of said mounting plates in said set comprises a thin square like plate having four corners, said plate having an concave indentation a preselected distance inward between one or more of the corners of said mounting plate, and said mounting plate further comprising an interior hollow defined by a sidewall portion, said sidewall portion sized and shaped for snug fitting engagement with said exterior surface portion of said second interior load bearing arm at a preselected location therealong.

38. The apparatus as set forth in claim 1, wherein said first frame bracket comprises a pivotable mounting bracket, wherein said pivotable mounting bracket is adapted for pivotably affixing said support strut to said adjustable mounting bracket.

39. The apparatus as set forth in claim 1, wherein said second frame bracket comprises an adjustable mounting bracket, said adjustable mounting bracket comprising a plurality of attachment apertures therein adapted for adjustably affixing said support strut to said adjustable mounting bracket.

40. A tie down system for securing an object to a pre-existing mounting structure on a motor vehicle, said motor vehicle having a right side and a left side, said pre-existing structure comprising a frame and a trailer hitch having a transverse tubular rear portion with an interior sidewall, said tie down system comprising:
  (a) on the right side of said vehicle,
    (1) a first frame bracket, said first frame bracket adapted to mate with said frame;
    (2) a first interior load bearing arm and a first exterior load bearing arm, said first interior load bearing arm projecting from said first frame bracket, said first interior load bearing arm having a distal end, said distal end adapted for accepting said first exterior load bearing arm therein;
    (3) a second frame bracket adapted to mate with said frame;
    (4) a first support strut extending between said second frame bracket and said first interior load bearing arm,
    (5) a second interior load bearing arm and a second exterior load bearing arm, said second interior load bearing arm having
      (i) a first, interior end sized and shaped for snug interfitting engagement with said interior sidewall of said transverse tubular rear portion of said hitch, and (ii) a distal end sized and shaped for interfitting with and attachment to, along a longitudinal axis, said second exterior load bearing arm;
  (b) on the left side of said vehicle,
    (1) a third frame bracket, said third frame bracket adapted to mate with said frame;

(2) a third interior load bearing arm and a third exterior load bearing arm, said third interior load bearing arm projecting from said third frame bracket, said third interior load bearing arm having a distal end, said distal end adapted for accepting said third exterior load bearing arm therein;

(3) a fourth frame bracket, said fourth frame bracket adapted to mate with said frame;

(4) a second support strut extending between said fourth frame bracket and said third interior load bearing arm, (5) a fourth interior load bearing arm, and a fourth exterior load bearing arm, said fourth interior load bearing arm having
  (i) a first, interior end sized and shaped for snug interfitting engagement with said interior sidewall of said transverse tubular rear portion of said hitch, and (ii) a distal end sized and shaped for interfitting with and attachment to, along a longitudinal axis, said fourth exterior load bearing arm.

* * * * *

UNITED STATES PATENT AND TRADEMARK OFFICE
CERTIFICATE OF CORRECTION

PATENT NO. : 6,688,672 B2
DATED : February 10, 2004
INVENTOR(S) : Kay, Jack

It is certified that error appears in the above-identified patent and that said Letters Patent is hereby corrected as shown below:

Column 2,
Line 12, after the words "mounting structure for", delete "a".

Column 3,
Line 26, after the word "camper", delete ";" and substitute therefore -- . --.

Column 4,
Lines 32 and 37, after the word "horizontal", delete "(; i.e.," and substitute therefore -- (i.e., --.

Column 5,
Line 4, after the word "receiver", delete "." and insert therefore -- shown in Figs. --.
Line 27, after the words "is secured in", delete "place ," and substitute therefore -- place, --.
Line 31, after the words "affixed on the", delete "drivers" and substitute therefore -- driver's --.
Line 61, after the words "vehicle 2, for", delete "example" and substitute therefore -- example, --.

Column 6,
Line 13, after the words "a camper", delete "II" and substitute therefore -- 11 --.
Line 17, after the word "used", insert -- to --.
Line 29, after the words "as provided by", delete "a" and substitute therefore -- an --.

Column 8,
Line 45, after the word "mechanism" delete "46, 50" and substitute therefore -- 46 and 50, --.
Line 47, after the words "strut 48 is", delete "a".

Column 11,
Line 17, after the words "Also, bullet plate", insert -- 150 --.
Lines 21 and 24, after the word "arm", delete "98" and substitute therefore -- 130 --.
Lines 28 and 33, after the word "to the horizontal", delete "(; i.e.," and substitute therefore -- (i.e., --.

Column 13,
Line 23, after the word "bearing", delete "arm," and substitute therefore -- arm; --.

UNITED STATES PATENT AND TRADEMARK OFFICE
CERTIFICATE OF CORRECTION

PATENT NO. : 6,688,672 B2
DATED : February 10, 2004
INVENTOR(S) : Kay, Jack

It is certified that error appears in the above-identified patent and that said Letters Patent is hereby corrected as shown below:

Column 16,
Line 16, after the words "said plate having", delete "an" and substitute therefore -- a --
Line 55, after the words "bearing", delete "arm," and substitute therefore -- arm; --.

Column 17,
Line 11, after the word "bearing", delete "arm," and substitute therefore -- arm; --.

Signed and Sealed this

Fifteenth Day of February, 2005

JON W. DUDAS
*Director of the United States Patent and Trademark Office*